(12) United States Patent
Vetrovec et al.

(10) Patent No.: US 7,866,176 B2
(45) Date of Patent: Jan. 11, 2011

(54) AUTONOMOUS WATER SOURCE

(75) Inventors: Jan Vetrovec, Larkspur, CO (US);
Katerina Vetrovec, Larkspur, CO (US)

(73) Assignee: Aqwest LLC, Larkspur, CO (US)

( * ) Notice: Subject to any disclaimer, the term of this patent is extended or adjusted under 35 U.S.C. 154(b) by 0 days.

(21) Appl. No.: 12/317,388

(22) Filed: Dec. 22, 2008

(65) Prior Publication Data
US 2009/0133414 A1 May 28, 2009

Related U.S. Application Data

(63) Continuation of application No. 11/655,441, filed on Jan. 19, 2007, now Pat. No. 7,628,144.

(51) Int. Cl.
*F25D 21/00* (2006.01)
(52) U.S. Cl. .................. 62/235.1; 95/120; 96/108; 202/234; 203/10; 203/49
(58) Field of Classification Search ............... 62/235.1, 62/272; 202/234, 185.3; 203/49, 10, DIG. 1; 95/120, 125, 126; 96/108
See application file for complete search history.

(56) References Cited

U.S. PATENT DOCUMENTS 3,490,996 A * 1/1970 Kelly, Jr. .................. 202/234
4,342,569 A * 8/1982 Hussmann .................. 95/124
4,385,702 A * 5/1983 Lenker et al. ............... 209/629
4,487,659 A * 12/1984 Stark ........................ 202/172
5,650,050 A * 7/1997 Kaufmann .................. 202/234
6,116,034 A * 9/2000 Alexeev et al. ............... 62/92

* cited by examiner

*Primary Examiner*—William E Tapolcai

(57) ABSTRACT

An autonomous water source for extracting water from ambient air and delivering it to a plant to support growth. The system is based on an adsorption-desorption-condensation cycle using a sorption material to extract moisture from ambient air and condensing the water vapor driven off from the sorption material by subsequent heating and followed by condensation. Liquid condensate produced in this process on the condenser is collected and delivered by gravity to a plant to reduce thermal stress and to support growth. The invention provides a sustainable source of irrigation water for agriculture and forestry, including areas where no water resources exist or are not economically viable. It can be tailored in size, and therefore, output capacity, reflecting the desired water requirements of a particular application, and can be used to replace most agricultural situations now reliant on surface water drip feed systems. The device is simple, rugged, invulnerable to rain, snow, and freezing conditions, and can be designed to last for many years without service as there are few moving parts and power required for operation is provided by sunlight.

21 Claims, 12 Drawing Sheets

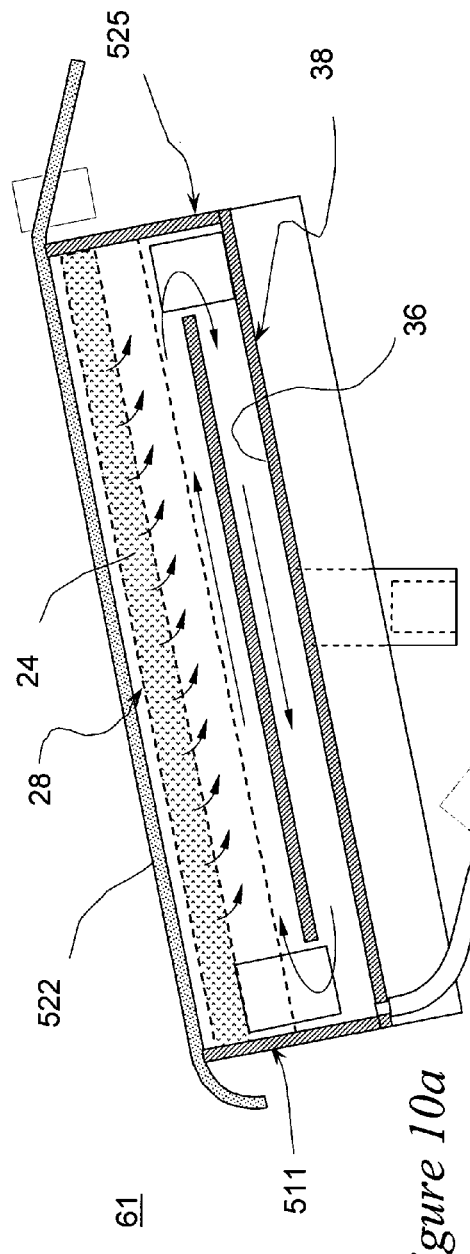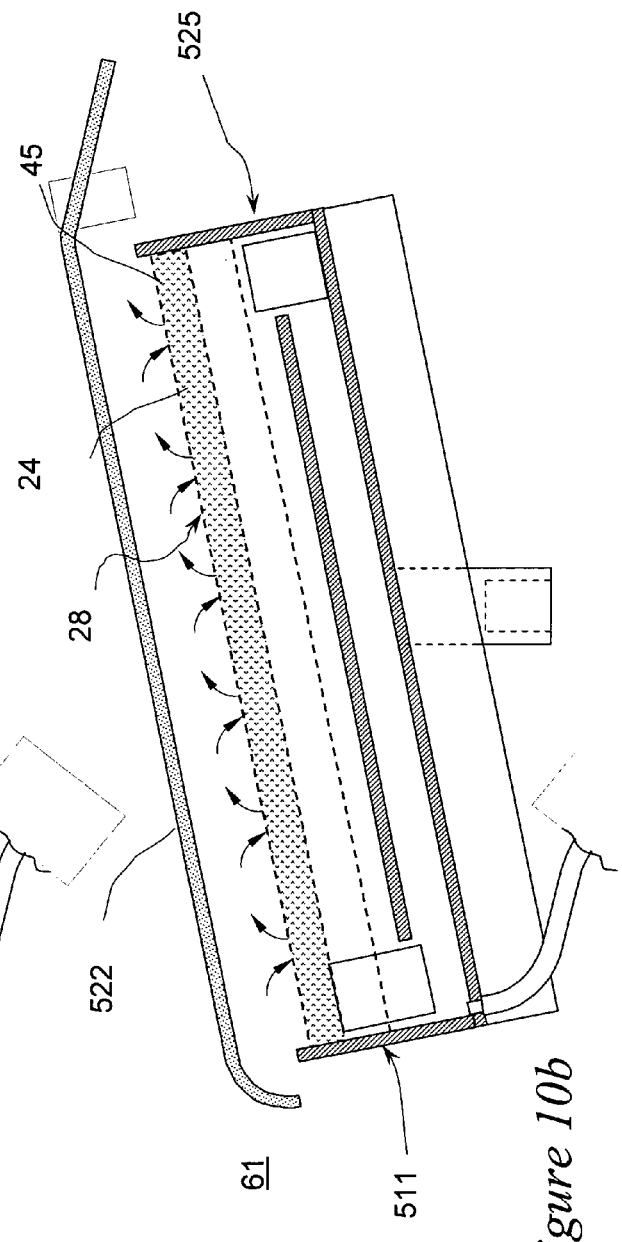

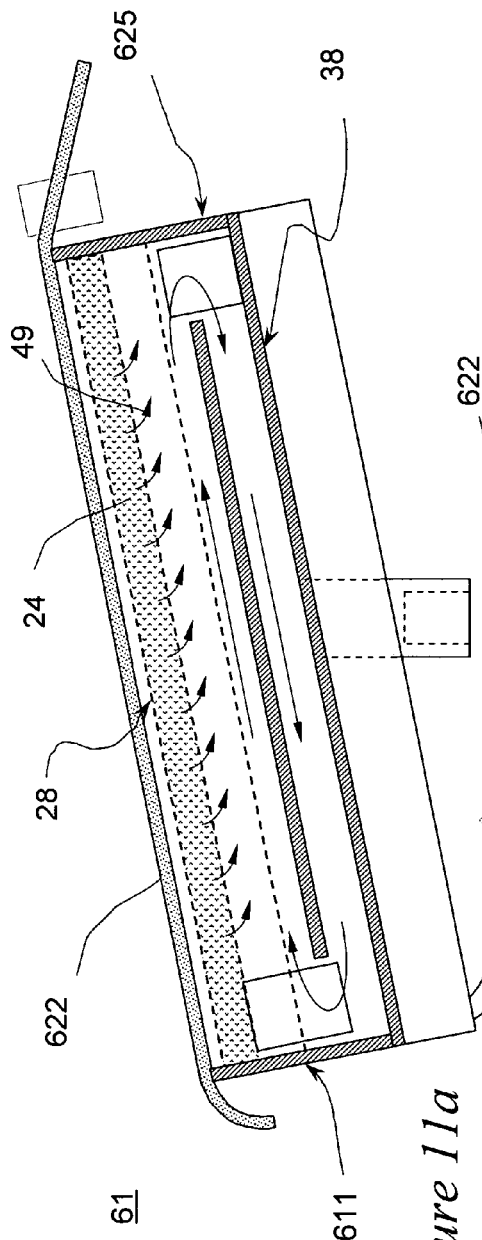
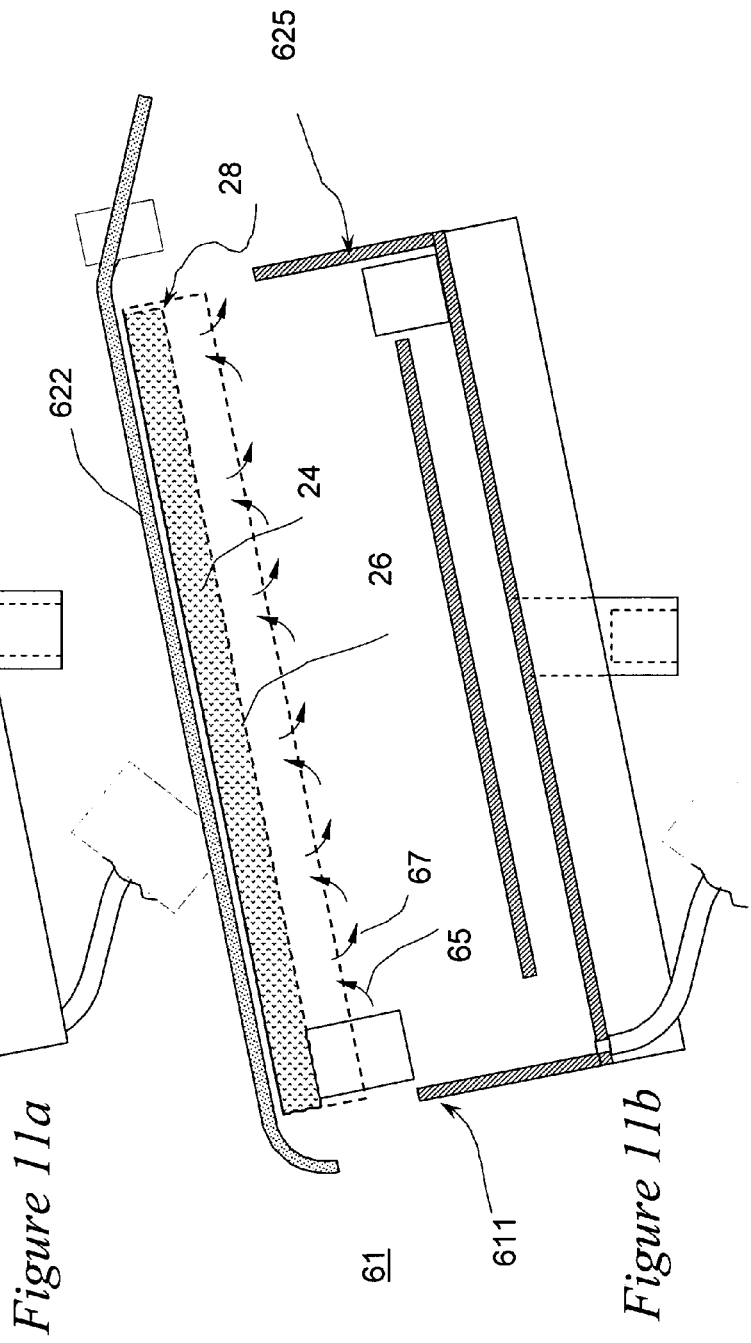
Figure 11a
Figure 11b

AUTONOMOUS WATER SOURCE

CROSS-REFERENCE TO RELATED APPLICATIONS

This patent application is a continuation of application of U.S. Ser. No. 11/655,441 filed on Jan. 19, 2007 now U.S. Pat. No. 7,628,144 and entitled Autonomous water source, the entire contents of which is hereby expressly incorporated by reference.

FIELD OF THE INVENTION

This invention relates to the production of water and more particularly relates to an autonomous water source that produces water by extraction of water vapor from the atmosphere.

BACKGROUND OF THE INVENTION

Life depends on water. Our entire living world—plants, animals, and humans—is unthinkable without abundant water. Human cultures and societies have rallied around water resources for tens of thousands of years—for drinking, for food production, for transportation, and for recreation as well as inspiration.

Large portions of Earth's dry land are arid and experience shortages of water. Such shortages become more acute each year in many regions as a result of population growth, climate changes and environmental pollution. The aquifers of the world on which agriculture depends in drier regions are being drained of their ground water faster than the reserves can be replaced by natural percolation of rainfall and runoff. Water shortage results in increased competition for water sources to satisfy the needs of agriculture, industry, and community, which places a great stress on existing water supplies. These conditions create an enduring need for a new water source for use in agriculture and forestry that would reduce pressure on existing supplies, potentially reversing the depletion of reservoirs and ground water, decrease the likelihood of forest fires and resulting soil erosion, and potentially open new lands for cultivation and human habitation.

Water shortage in arid areas can be addressed in two ways: 1) improved management of existing water resources and 2) development of new resources. Resource management techniques such as conservation and irrigation have been already put into common practice in many arid and drought affected areas. However, the development of new water resources has been rather slow. Possible new resources include sea water desalination and extraction of water from atmospheric air. Desalination is not generally suitable for many inland areas as it requires easy access to sea water. In addition, desalination is very capital and energy intensive, requires an acceptable method for disposal of brine, and construction of new plants is subject to many environmental regulations.

One frequently overlooked approach is direct extraction of water from atmospheric air. Each year some $5.8 \times 10^{14}$ m$^3$ ($4.7 \times 10^{11}$ acre-feet) of water evaporate from the land and ocean surfaces. The resulting moisture in the air acting through natural rainfall replenishes water in the rivers, lakes and aquifers. In particular, part of the huge amount of water evaporated in the oceans is carried by wind to arid regions of the world. Half the total atmospheric water is contained in the lower 6,000 ft of the atmosphere. For example, 1 m$^3$ of air at ambient temperature and 40% humidity contains about 11 grams of water. And yet atmospheric air, a major renewable source of fresh water, is under-exploited by man.

One method for direct extraction of water from atmosphere that has been practiced since the 1940's is cloud seeding which can significantly improve rain yield. However, this method requires availability of dense low clouds and thus it is limited to certain coastal areas and the wet season of the year.

A more direct method would target the omnipresent moisture in atmospheric air and would be available during the hot and dry summer months. It is well known that air in many arid coastal areas is very humid. However, measurements show that even the dry air in the desert contains enough moisture that could be extracted and used as a water source of agriculture and forestry.

The idea of reducing atmospheric moisture into liquid water is not new. Patent literature worldwide contains some 30 patents for methods and devices in this area. However, vast majority of these concepts is characterized by complexity (including the need for refrigeration, blowers, high-pressure chambers, and/or large tracts of real estate) and motive power. As a result, most of these concepts remained only on paper and none has been practical enough to win commercial acceptance.

There are several approaches for direct extraction and liquefication water from atmospheric air namely 1) direct condensation at ambient pressure, 2) direct condensation at elevated pressure, and 3) adsorption onto sorption medium followed by secondary extraction (usually by heating) followed by condensation.

Direct condensation at ambient pressure is an approach in which atmospheric air is presented with a condensing surface cooled to below a dew point. Contact with the surface cools the air and part of its water vapor content is reduced to liquid appearing on the surface as a condensate. Heat released in condensation must be continuously removed from the condensing surface otherwise the surface will warm up to above the dew point thereby inhibiting further condensation. In nature, dew commonly appears on objects that cool below the dew point by radiating some of their thermal energy into space and thus cooling below temperature of ambient air and the dew point. For this phenomenon to occur, the separation of air temperature and the dew point must be rather small (typically a few degrees Centigrade). Thermal radiation processes can be enhanced by man-made means as disclosed by Riley et al in U.S. Pat. No. 3,318,107. However, this apparatus too requires the separation of air and dew point temperatures to be rather small, making it unusable in most atmospheric conditions, especially in dry regions.

To condense water from air having significant temperature and dew point separation requires a more efficient heat removal than rendered by thermal radiation. Courneya in U.S. Pat. No. 4,351,651 discloses an apparatus which draws ambient humid air into an underground heat exchanger rejecting heat into soil. This invention assumes that the temperature of soil is significantly lower than the temperature of ambient air. While this is generally true in the daytime, the air temperature-dew point separation at this time is also quite significant except in cases of extremely high humidity. Such conditions of very high humidity are rather rare in dry climates. At nighttime, the ambient air is usually cooler than the temperature of the soil and the apparatus would have little chance of working. Other approaches involving passive cooling by high-altitude air or sea water have been disclosed by Phela, Jr. et al in U.S. Pat. No. 3,746,867 and by Gerard et al in U.S. Pat. No. 3,498,077 respectively have similar limitations.

To overcome the limitations of passive cooling, a variety of condensing devices employing refrigeration have been proposed. For example, Rosenthal in U.S. Pat. No. 5,857,344 discloses an apparatus for condensing atmospheric moisture using a vapor compression type refrigeration. Similar approach is also disclosed by Littrell in U.S. Pat. No. 4,892,570. To overcome the limitations of expensive and noisy machinery associated with this type of refrigeration, several condensing devices have been proposed using solid-state refrigerators based on the Peltier effect. Peltier coolers are compact, quiet, have no moving components, but are somewhat more expensive and less thermodynamically efficient than vapor compression units. Devices and methods disclosed by Biancardin in U.S. Pat. No. 4,315,599, Wold in U.S. Pat. No. 5,601,236, and Peeters et al. in U.S. Pat. No. 5,634,342 all use Peltier effect condensing units and are intended for providing water to plants.

While refrigeration type condensing units are very capable in reducing atmospheric moisture to liquid water (as exemplified by ordinary household air condition unit on a humid day), their water output is not commensurate with their initial and operating costs. The key reason for the latter is that removal of moisture by condensation from air with significant temperature-dew point separation requires cooling large quantities of air to extract rather small amount of water. In arid regions where the need for new water sources is the greatest; the air temperature-dew point separation is quite significant (20-40 degrees Centigrade in the daytime), which would make the operation of condensing devices prohibitively expensive. Using solar cells to generate power required for the refrigerator (as disclosed, for example, by abovementioned Wold) is hardly satisfactory since electric power from solar cells is rather expensive.

Another approach to direct extraction of water from atmospheric air is condensation at elevated pressure. It is well known that when atmospheric air is compressed above ambient pressure, its dew point increases and condensation can occur at ambient temperature. This phenomenon is actually a hindrance in many compressed air installations and various means have been devised to dehumidify compressed air in industrial application. See for example Ewing et al. in U.S. Pat. No. 2,077,315 or Alderson et al. in U.S. Pat. No. 3,226,948. Devices and methods for direct extraction of water from air using condensation at elevated pressure have been disclosed by Spletzer et al. in U.S. Pat. Nos. 6,230,503, 6,360,549, and 6,511,525.

One common challenge all water devices using condensation at elevated pressure must overcome is adiabatic heating of air during compression. This heat must be removed from compressed air lest the desired reduction in air temperature-dew point separation would require even higher pressures to attain. This heat, unless recovered through a heat exchanger, is lost and must be made up by some of the mechanical work required for compression. Regardless of the approach taken, all of the inventions based on this approach require a compressor and significant motive power. This makes it very challenging to realize these inventions in compact, lightweight, inexpensive devices operating mostly on renewable sources of energy.

Yet another approach for extraction of water from atmospheric air uses sorption materials suitable for preferential trapping of water molecules by either physical adsorption such as for example exhibited by molecular sieves, or chemical adsorption such as for example exhibited by lithium chloride. There is a long list of such suitable materials, see for example, D. K. Veirs et al, "Technical Basis for Packaging Glovebox Moisture Content," LA-UR-02-560, Los Alamos National Laboratory (undated). Once the sorption material is saturated with water to desirable level, application of heat drives the adsorbed water vapor out and liquid water can be obtained by condensation. There is a significant number of inventions based on this technique. For example, Groth et al. in U.S. Pat. No. 4,146,372 discloses an apparatus that receives humid air at night and uses suitable sorption medium to extract moisture from it. Night air is also used to cool down a condenser with a large thermal mass. In the daytime, solar heating is used to drive the water vapor out of the sorption medium. Blowers are used to direct desorbed water vapor into the condenser where some of the water is condensed. Note that desorbed water vapor is diluted with fresh air which makes desired condensation more difficult. This apparatus is envisioned on a very massive scale with vertical separation as much as 200 meters between various components. It requires motive power to drive blowers for inducing night air into the device and to move moist air with desorbed water vapor to the condenser. Hussmann in U.S. Pat. Nos. 4,342,569 and 4,345,917 disclosed various improvements to Groth and including a recirculation of air transporting desorbed water vapor to the condenser.

Michel et al. in U.S. Pat. No. 4,285,702 discloses an apparatus and method similar to that of Groth and Hussmann except that it can be realized in a much smaller apparatus. Air transporting desorbed water vapor from the sorption medium to the condenser is recycled within the device using a blower. Other similar devices of this type are disclosed in U.S. Pat. No. 4,299,599 and U.S. Pat. No. 4,365,979 of Tokeyama et al. Clarke in U.S. Pat. No. 5,233,843 and Conrad in U.S. Pat. No. 6,156,102 disclose adsorption type devices using liquid sorption media.

Krumsvik in U.S. Pat. No. 5,846,296 discloses a pyramid-shaped apparatus with transparent walls containing sorption medium in its lower portion and a condenser in its upper portion. At night, the unit admits humid air which deposits moisture in the sorption medium. In the daytime, solar heating is used to drive the moisture from the sorbant and the vapor is allowed to rise up to the condenser where it is turned into liquid. The arrangement of sorption medium in the pyramid is not conducive to obtaining desorption temperatures much beyond outside air temperatures since much of medium is not directly irradiated by the sun and a lot of the heat is lost through the pyramid walls. Hence only a small portion of adsorbed water can be actually desorbed. Furthermore, this device has large empty volume filled by air. This means that a large portion of desorbed water will be expended in merely used to increase humidity of air inside the pyramid. Since this air is also heated, its dew point will correspondingly increase. Thus the air can accommodate more moisture without condensation. Because in a steady state, desorption cannot proceed faster than condensation, it is difficult to see how this device, despite its large size, could be conducive to water production at high rates. Similar apparatus is also disclosed by Alexeev et al. in U.S. Pat. No. 6,116,034.

Tsymerman in U.S. Pat. No. 6,336,957 discloses an adsorption type apparatus and method for recovery of water from atmospheric air having a chamber with two parts; one housing the sorption medium and the other housing a condenser. The two parts of the chamber are connected by plumbing. A fan blows outside air through the sorption medium while the medium is cooled by imbedded heat exchanger. The chamber is then isolated from outside air and the sorption medium is heated using the imbedded heat exchanger to the point where the internal pressure rises significantly above ambient pressure. When a pressure relief valve is blown, partial vacuum is suddenly created in proximity of the condenser, thereby creating a pressure gradient that starts delivering desorbed moisture to the condenser. Because the pressure relief valve exhaust residual air from the chamber, subsequent condensation takes place at partial vacuum. The condenser is cooled by unspecified external means. The chamber must be constructed so that it can withstand elevated pressure as well as vacuum.

Methods and devices disclosed in all of the above prior art are either not conducive to operation in dry regions, and/or not suitable for production of water at significant rates, and/or require costly mechanical compressors or complex and expensive refrigeration, and/or cannot be implemented in compact portable units, and/or require large amounts of motive power.

Hence, there is need for new devices and methods that could lead to compact, lightweight, robust, inexpensive, transportable units with few moving parts and operating mostly on renewable sources of energy.

It is therefore one object of the present invention to provide a sustainable source of irrigation water for agriculture, including areas where no water resources exist or are not economically viable. As an alternative to other forms of irrigation, the invention provides salt-free water, thereby decreasing the salt-content in the soil, reducing injury to crops plants, and improving quality of certain crops (especially wine grapes). Another potentially important benefit to agriculture will be livestock watering stations for remote areas where local water supplies are non-existent or unreliable.

Another object of the present invention is to provide an alternate source of water thereby reducing the competition for existing water resources used by current irrigation techniques. Besides providing immediate relief, this would also allow returning reservoirs and aquifers to their normal level, making them available for combating future droughts while increasing recreation and tourism. In addition, increased ground water levels will also improve the health of forests, enabling them to endure droughts, and be less susceptible to wildfires and soil erosions. Furthermore, when deployed in forestry settings, the invention can increase the survival of newly planted trees and help in natural revival of the forest.

Shortage of water impedes the development of the vast areas of arid land. It is yet another object of the present invention to provide a suitable water supply in these areas and open them to agriculture and human habitation.

It is yet another object of the present invention to provide a self-contained, autonomous, transportable, inexpensive, environmentally friendly device for the autonomous long-term irrigation of plants and trees in agricultural, forestry, and household settings.

Still another object of the invention to provide a method and apparatus for producing liquid water from ambient air using low energy input.

Yet another object of the invention to provide a method and apparatus for producing liquid water from ambient air using solar power.

Yet another object of the invention to automatically water plants to support plant growth.

Yet another object of the invention to provide a source of water in arid regions.

Yet another object of the invention to provide livestock watering stations for remote areas where local water supplies are non-existent or unreliable.

Yet another object of the invention to provide a source of water for household use in arid areas.

Yet another object of the invention to provide a source of water for watering of indoor plants.

It is yet another object of the invention to provide method for reducing susceptibility of growing microorganisms inside an apparatus for producing liquid water from ambient air.

BRIEF DESCRIPTION OF THE INVENTION

The autonomous water source (AWS) of subject invention disclosed herein extracts water from ambient air and delivers it to a plant to support growth. The system is based on an adsorption-desorption-condensat-ion (ADC) cycle using a sorption material to extract moisture from ambient air and condensing the water vapor driven off from the sorption material by subsequent heating. In particular, desorption is carried out with the sorption medium enclosed in a housing and heated to about 20 to 50 degrees above ambient air temperature. As a result, at least a portion of the previously adsorbed moisture is desorbed thereby creating a warm and humid volume of air within the housing. The humid air is allowed to contact a condenser maintained at about the ambient temperature of the environment. As a result, a significant portion of the moisture is removed from the humid air by condensation. A closed flow loop is established delivering warmer air with higher humidity from the sorption medium to the condenser, and cooler air with lower humidity from the condenser to the sorption medium.

Liquid condensate produced in this process on the condenser is collected and delivered by gravity to a plant to reduce thermal stress and to support growth. The water delivery assembly can also include a reservoir which can hold a fertilizer and/or transpiration inhibitor, which is gradually dissolved and delivered to the plant. Alternately, fertilizers can be introduced by means of metered dripping. Timing of water delivery can be made more precise by employing electronic controls. Such electronic controls may also include electrical probes for detecting soil moisture placed in the soil in proximity of plant roots. Data from such probes can be used to determine both the timing and quantity of water delivery to the plant. Whichever delivery technique is used, the subject invention provides sustainable source of irrigation water for agriculture and forestry, including areas where no water resources exist or are not economically viable.

One advantage of using the invention over existing irrigation techniques is that the invention generates salt-free water. Dry climate and susceptibility to drought in the arid regions has led to ever increasing reliability on irrigation. However, all irrigation water (specially in arid regions) contains dissolved mineral salts with composition and concentration depending on the source. It is well known that too much salt can injure the plants, reduce crop yield and quality, or even prohibit crop production altogether. Consequently, the agriculture in arid regions would greatly benefit from a suitable supply of water with reduced salt content.

Alternate uses include livestock watering stations for remote areas where local water supplies are non-existent or unreliable. Another alternate application is production water for household use in arid areas. Yet another alternate application is production water for watering indoor plants.

The invention can be practiced in several embodiments. In a first embodiment of the subject invention, solar radiation is used to provide the heat for desorption of water vapor from sorption medium while the condenser is cooled by ambient environment. Several variants for conveying solar heat to the sorption material are disclosed. Several variants for cooling the condenser are disclosed, including air cooling, cooling by contact with soil, and rejecting the heat of condensation to a phase change medium. In addition, several variants for providing ambient humid air to the sorption medium are disclosed. In a second embodiment of the invention, electric (rather than solar) heating is used to provide the heat for desorption of water vapor from sorption medium. In a third embodiment of the invention, a transparent member is used to condense moisture released from the sorption medium heated by solar energy.

The present invention can be tailored in size, and therefore, output capacity, reflecting the desired water requirements of a particular application, and can be used replace most agricultural situations now reliant on surface water drip feed systems. The device is simple, rugged, invulnerable to rain, snow, and freezing conditions, and can be designed to last for many years without service as there are few moving parts and power required for operation provided by sunlight.

Other features, advantages, objects and embodiments of the invention will be readily apparent to those skilled in the art from the following description of preferred embodiments taken in conjunction with the claims and accompanying drawings.

BRIEF DESCRIPTION OF THE DRAWINGS

FIGS. 10a and 10b illustrate an alternate method for exposing a sorption medium to ambient air.

FIGS. 11a and 11b illustrate another alternate method for exposing a sorption medium to ambient air

DETAILED DESCRIPTION OF THE PREFERRED EMBODIMENTS

Definitions

Figure 1:
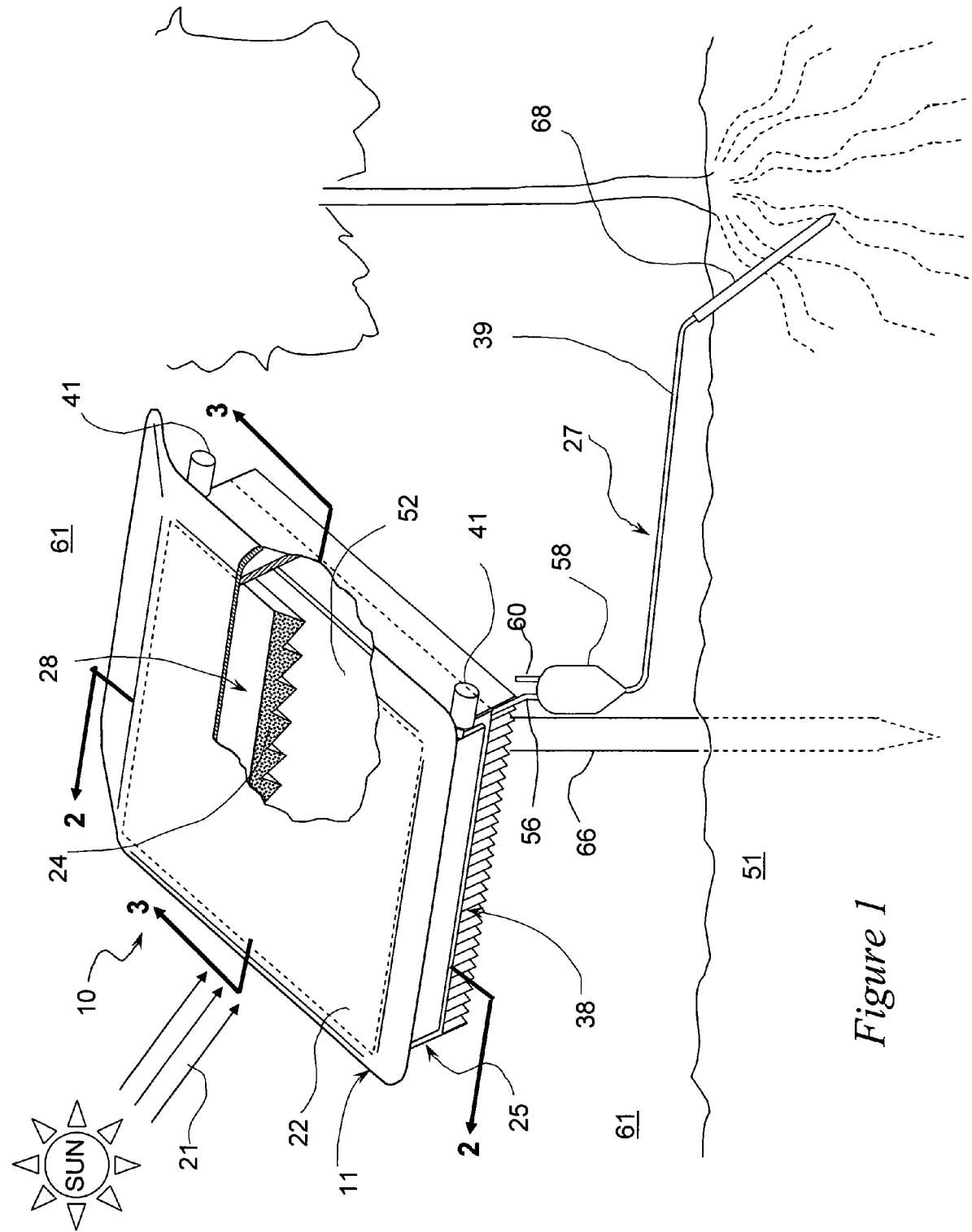
FIG. 1 is an isometric view of an autonomous water source in accordance with a first preferred embodiment of the subject invention providing water to a plant.

As used herein:

Solar radiation band: A band corresponding to the peak of the solar radiation spectrum represented by a band from 0.3 to 3 micrometers.

Thermal radiation band: A band corresponding to the peak portion of the thermal radiation spectrum in temperature band 0 to 100 degrees Centigrade as represented by a band from 3 to about 20 micrometers.

Isotherm: A curve (e.g., on a x-y plot) on which every point represents conditions at the same temperature.

Sorption medium: A material capable of adsorbing water vapor from air at a first (near ambient) temperature and releasing adsorbed water vapor into surrounding space at a second temperature, which is higher than the first temperature. Materials with such properties are sometimes referred to as desiccants. Suitable materials include certain zeolites (especially synthetic zeolite types 3A and 4A manufactured, for example by Zeochem.™., Louisville, Ky.), activated alumina (for example type F-200 manufactured by Alcoa Industrial Chemicals, Houston, Tex.), silica gel, carbon molecular sieve (such as e.g., NSC-4 manufactured by Calgon Carbon. Corp.), carbon filaments, glass filaments, and others. Synthetic zeolite 3A is a preferred sorption medium because it has a pore size about 3 Angstroms in size, which is sufficient for accepting a water molecule while excluding larger molecules. In this sense, the zeolite acts as a molecular sieve. This feature is important to avoid adsorption of larger hydrocarbon molecules of various air pollutants that may have strong bond to the sorption sites and may occupy them permanently, which would thus "poison" the sorption medium. Another advantage of zeolites is their capacity to adsorb moisture from air even at very low humidity levels.

Another preferred sorption medium is silica gel because it very inexpensive, and has very steep isotherms. The latter means that under certain conditions, even modest rise in silica gel temperature can release from it large amount of moisture. Strongly hygroscopic materials such as lithium chloride or calcium chloride can be also used if imbedded into suitable porous solids. See, for example, Aristov, Y. I, Tokarev, M. M., DiMarco, G., Cacciola, G., Restuccia, D., and Parmon, V. N., "Vapor-Condensed Matter and Melting-Solidification Equilibria in Calcium Chloride-Water System Dispersed in Silica Gel Pores," Russian J. of Phys. Chem., vol. 71, no. 2, p 197 (1997), and Mina, E. M. and Newell, T. A., "Desiccant Characteristics of Kaolin-Salt Mixtures," in proc. form 21st Intl. Congress of Refrigeration, Washington, D.C., Aug. 17-23, 2003.

The sorption medium for use with the subject invention may be also a mixture of several suitable adsorption materials. In addition, sorption medium is preferably provided in granular form with grain size ranging between 0.05 to 0.25 inch. An agglomeration of loose granules of sorption medium is known in the art as "packed bed." Synthetic zeolites produced in granular form are usually mixed with clay as a binding material. Certain types of sorption media for use with the invention can be dyed with a dark color dye (preferably black) to improve their absorption of light in the solar radiation band. Sorption medium for use with the subject invention is preferably provided in generally flat, shallow, tray-like containers, thereby facilitating good communication with surrounding air.

Transparent material: A transparent material is a material with good transmission properties in the solar radiation band. Such materials include family of glasses (especially soda lime glass, alumino-silicate glass, soda-zinc, boro-silicate, fused silica quartz). Certain transparent materials may (in addition to their good transmission properties in the solar radiation band) also have good transmission properties in the thermal radiation band. Such materials include family of plastics (especially plexiglass, lexan, acrylics, polyethylene), polycrystalline materials such as polycrystalline glass and certain ceramics, and crystalline materials such as sapphire. Note that certain transparent ceramics and sapphire have comparably high thermal conductivity.

Description of a First Preferred Embodiment

Referring now to FIG. 1 illustrates an autonomous water source 10 in accordance with a first preferred embodiment of the subject invention delivering water to a plant. Autonomous water source 10 comprises water source assembly 11, water delivery 27, and support structure 66. Water source assembly 11 further comprises face sheet 22, tray 28 containing a sorption material 24, housing 25 adapted to alternately permit communication between outside atmosphere 61 and the sorption material 24 and restricting such communication, and condenser 23. The water delivery assembly 27 comprises a delivery tube 39 and delivery tip 68. The delivery tip 68 is installed in the soil in the proximity of plant roots.

Figure 2:
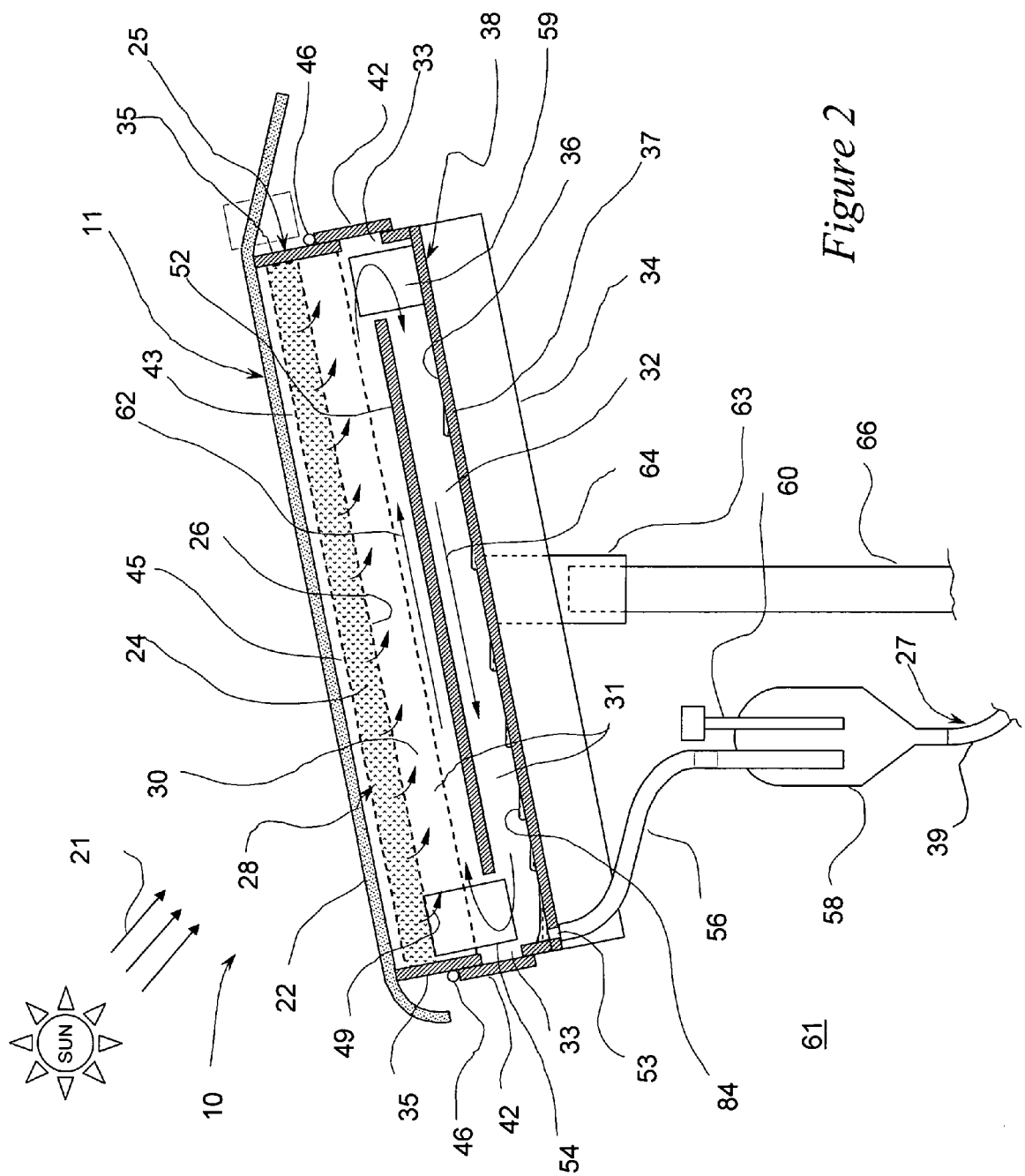
FIG. 2 is a cross-sectional view of an autonomous water source taken at 2-2 of FIG. 1 showing the configuration for a water desorption/condensation cycle.
Figure 3:
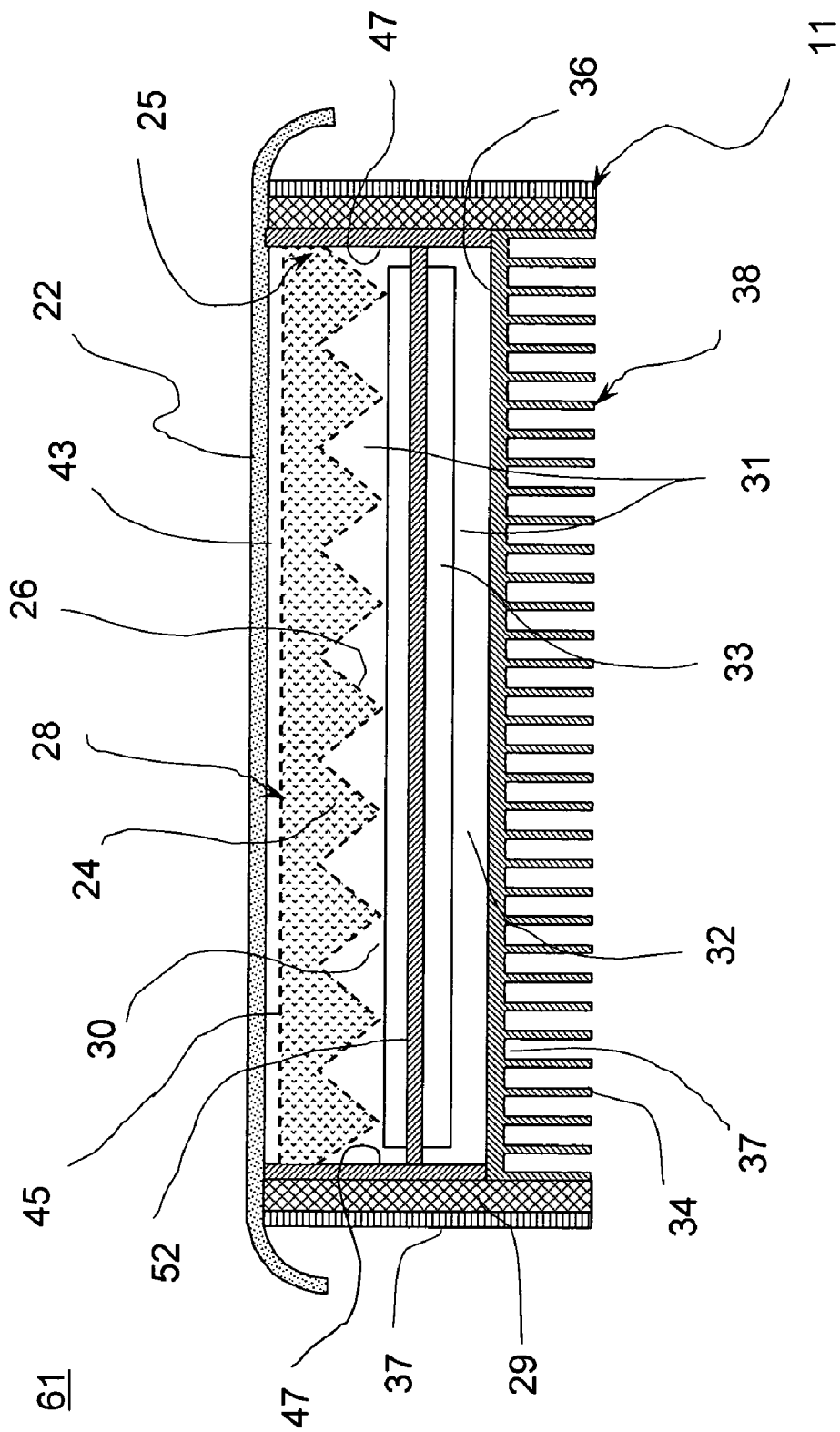
FIG. 3 shows a cross-sectional view of an autonomous water source taken at 3-3 of FIG. 1.

Referring now to FIGS. 2 and 3, face sheet 22 is made of a transparent material having high transmission in the solar radiation band. Preferred materials for face sheet 22 used with the first embodiment of the invention have a low thermal conductivity. Depending on the transverse dimensions and the material used, face sheet 22 is preferably between 0.1 to 10 millimeters thick. Face sheet 22 is preferably formed into a shape of a shallow upside-down tray with edges generally sloping toward ground 51 (FIG. 1) so that it may serve both as a window for solar radiation and as a roof that protects other parts of watering source assembly 11 (FIG. 3) from inclement weather. In addition, face sheet 22 may be also equipped with optical coatings to reduce reflection losses in the solar radiation band. External surface of face sheet 22 may also have a protective layer to reduce susceptibility to damage by solar radiation. In some variants of the subject invention it may be desirable to choose the face sheet material to also have good transmission in the thermal radiation band. As it will be explained below, this property can enhance cooling of sorption medium 24 during the adsorption cycle.

Tray 28 containing sorption medium 24 is located under the face sheet 22 and separated from it by an air gap 43, which serves as a thermal insulator. Preferably, air gap 43 is about 1 to 20 millimeters, and in some variants of the invention it may be omitted altogether. Bottom 26 of tray 28 is made of porous material that is easily permeable by water vapor and air. Preferred materials for tray bottom 26 include perforated or expanded plastic, perforated or expanded metal, perforated ceramics, wire mesh, screen, molded plastic screen, fiberglass screen, or alike, preferably having over 80% open area. Size of the pores or openings in the material for construction of tray bottom 26 should be appropriately smaller than the grain size of sorption medium 24. Tray bottom 26 can be flat or assume some other suitable shape to increase its surface area. Preferably, the bottom wall is formed into a series of v-shaped undulations as shown in FIG. 3. This feature allows more efficient exchange of air between sorption medium 24 and the cavity 31. Tray 28 may be open on the top, or it may have a cover 45. Tray cover 45 can be constructed from porous material of the type suitable for construction of tray bottom 26 or it can be made of non-permeable material transparent in the solar radiation band. Tray 28 may also include heat transfer elements such as internal warming fins 54 that extend to the lower portion of cavity 31. Such fins are in thermal communication with sorption medium 24 and made of material with good thermal conductivity, preferably aluminum or copper alloy.

Housing 25 is a rectangular frame-like structure located between face sheet 22 and condenser 38. Upper portion of housing 25 is occupied by tray 28. Tray bottom 26 together with condensing surface 36, side walls 47, and end walls 35 of housing 25 form a cavity 31. Preferably, volume of cavity 31 is less than 10 times the volume of the sorption medium 24. Preferably, housing 25 and/or its surface finish are made of materials that reduce the possibility of parasitic heat transfer by conduction and thermal radiation between cavity 31 and ambient environment, namely outside atmosphere 61. Preferred materials for construction of the housing 25 include plastics (e.g., PVC, ABS, acrylics, phenolics, polyesters, polyethulene, and glass-epoxy), ceramics, and glasses. Such materials can be opaque in nature, or dyed opaque, or have an opaque surface finish. In addition, the surface finish should be preferably substantially reflective in the solar radiation band.

Referring now to FIG. 3, to further reduce parasitic heat transfer, exterior surfaces of side walls 47 of housing 25 can be covered with thermal insulation 29. In addition sun shield 37 may also be provided to reduce the possibility of solar heating. A suitable sun shield could be a layer of reflective material such as sheet of aluminum, aluminum foil, or aluminized mylar.

End walls 35 (FIG. 2) of housing 25 have openings 33 that can allow exchange of air between the cavity 31 and outside atmosphere 61. Openings 33 at opposite ends are equipped with doors 42 mounted on hinges 46. Thus rotating doors 42 into open position allows exchange of air between outside atmosphere 61 and cavity 31 whereas rotating doors 42 into closed position inhibits such an exchange. Doors 42 are operated by actuators 41 (FIG. 1). It is understood that doors 42 act as isolation elements, and hence they may be replaced by other suitable elements performing the same function. Suitable alternatives include shutters and sliding doors. Note that openings 33 preferably have appropriate screens to prevent entry to insects, small animals, birds, as well as dust and debris.

Housing 25 preferably further includes flow separator 52 to reduce the possibility of mixing the warmer, more humid air near tray 28 and the cooler, less humid air near condensing surface 36. Flow separator 52 is generally a flat member typically 1 to 20 mm in thickness, impermeable to air and water, and preferably, made of materials having a low thermal conductivity. Suitable materials include those suitable for construction of the housing. In addition, the large surfaces of the separator can have a layer of material that is reflective at thermal radiation wavelength, such as for example exhibited by certain aluminum coatings. Additional layer of moisture resistant material may be added to protect the reflective layer.

Condenser 38 is generally a heat exchanger adapted for cooling the air inside cavity 31 and precipitating condensate therefrom. In particular, condenser 38 is generally configured as a flat member having a condensing surface 36 interior to cavity 31 and heat rejection surface 37. Condensing surface 36 is adapted for precipitation of condensate from humid air inside cavity 31. Heat rejection surface 37 is exposed to outside atmosphere 61 and is generally facing ground 51 (FIG. 1).

The exterior wall of condenser 38 may include external fins 34 to improve heat transfer to outside atmosphere 61. Preferably, heat rejection surface 37 and external fins 34 should have a low susceptibility to absorbing solar radiation reflected from ground 51. To accomplish this, heat rejection surface 37 and external fins 34 can be painted with a paint having acceptably low absorption in the solar radiation spectrum. If condenser 38 is fabricated from aluminum, heat rejection surface 37 and external fins 34 can be appropriately treated for example by anodizing to achieve acceptably low absorption in solar radiation band. In situations where reflection of solar radiation from ground 51 is acceptably low, heat rejection surface 37 and external fins 34 may be equipped with a finish to provide high emissivity in the thermal radiation band and thereby enhance radiative heat transfer therefrom. This may be accomplished with appropriate paint or coating, and in case the condenser is constructed from aluminum, appropriate anodizing can be used.

Joints between face shield 22, housing 25, and condenser 38 should be hermetically sealed so that when doors 42 are closed, cavity 31 is substantially isolated from outside atmosphere 61 except for the communication path though passageway or drain hole 53 and vent tube 60. Water source assembly 11 is positioned so that bottom 26 of tray 28 and condensing surface 36 are both sloping upward at approximately 10 to 40 degrees angle of elevation. This allows warmed flow 62 to rise up along bottom 26 toward higher located portions of cavity 31 and cooled flow 64 to sink along the condensing surface 36. In addition, this position provides a more efficient collection of solar radiation. To assure proper drainage of condensate from condensing surface 36 to drain hole 53, the shape of housing 25 and/or condenser 38 should be such that drain hole 53 would reside at the lowest point of cavity 31. The limitations on the choice of the elevation angle are as follows: at low elevation angles it is more difficult for the convective flow inside cavity 31 to develop, and at high elevation angles interception of solar radiation is significantly reduced.

Drain hole 53 allows condensate to exit cavity 31 and be fed by gravity through drain tube 56 into anti-siphon vessel 58. Anti-siphon vessel 52 prevents possible suction of water in drain tube 56 and water delivery assembly 27 back into cavity 31 as the sorption material 24 cools down due to reduced heat input as may be, for example, caused by passage of clouds, cast of shadows, or sunset. Anti-siphon vessel 58 includes vent tube 60 which is terminated outside the vessel and preferably capped with porous material to prevent entry of foreign objects including insects and dust. Consequently, slight reduction in pressure inside cavity 31 causes intake of air from outside atmosphere 61 into vent tube 60 and thus relieving the pressure reduction. Similarly, as sorption medium 24 warms up and releases water vapor, pressurization of cavity 31 is avoided by providing an exhaust path through drain tube 56, anti-siphon vessel 58, and vent tube 60. Drain tube 56 and vent tube 60 are preferably both terminated substantially below the top of anti-siphon vessel 58 to reduce the possibility of displacing water vapor accumulated inside.

Figure 4:
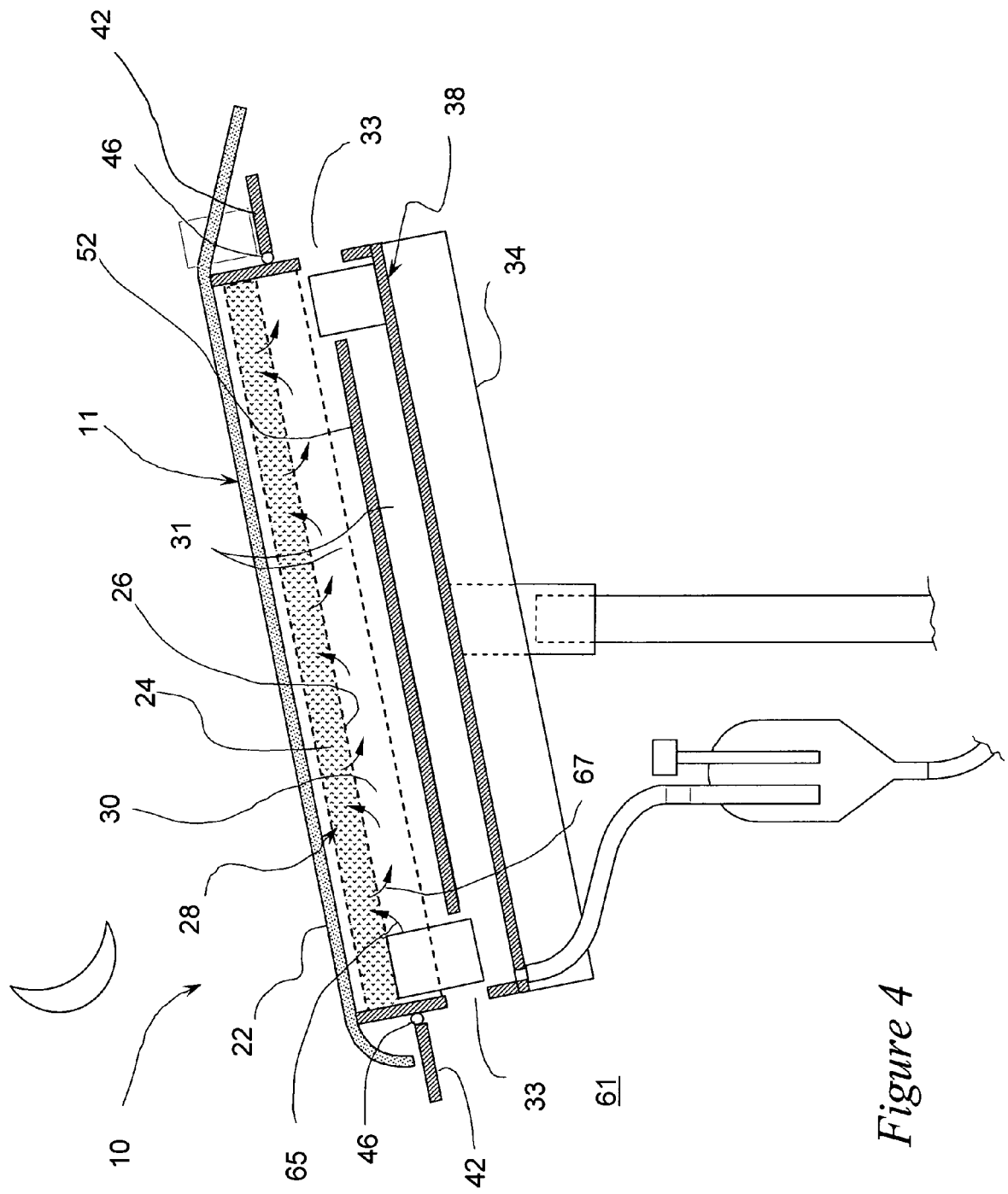
FIG. 4 is a cross-sectional view of an autonomous water source similar to FIG. 2 taken at 2-2 of FIG. 1 showing the configuration for a water adsorption cycle.

Autonomous water source 10 in accordance with a first preferred embodiment of subject invention operates in two cycles: adsorption and desorption. The adsorption cycle is preferably initiated after sunset when the ambient air temperature drops significantly from its daytime high levels. Preferably, such time is chosen so that condensate film and droplets remaining on condensing surface 36 have a chance to evaporate and be reabsorbed by sorption medium 24 as it is cooling down to about the temperature of ambient air. This also prevents attracting insects and animals that may otherwise sense water and may attempt to enter the unit. The adsorption cycle is initiated with actuators 41 opening doors 42, thereby allowing ambient air from outside atmosphere 61 to enter the cavity 31. This condition is shown in FIG. 4. As the ambient air with higher humidity 65 contacts sorption medium 24 in tray 28, significant part of its moisture content is transported from it by adsorption into sorption material 24. Air with reduced humidity 67 is released into cavity 31. The adsorption process generates a significant amount of heat. For example, the heat of sorption for synthetic zeolite 3A is roughly 4,000 kJ/kg of adsorbed water. The heat generated by the sorption process is initially deposited into sorption material 24 and then largely transferred into air flowing though cavity 31. In other words, the heat of sorption is rejected largely into ambient air. Experience shows that during the adsorption cycle sorption material 24 is generally few degrees Centigrade warmer than ambient air. Some of the heat adsorption can be also radiated into space providing face sheet 22 and cover 45 (if cover is used) of tray 28 both have good transmission properties in the thermal radiation band.

EXAMPLE 1

A tray about 350 square centimeters in area with top and bottom walls made of aluminum wire mesh (0.010" diameter, 15 mesh, about 73% open) weighing 155 grams is filled 733 grams of dry synthetic zeolite 3A, ⅛" grain size, manufactured by Zeochem.™., Louisville, Ky. The bottom of the tray is formed into V-shaped undulations approximately 1", deep and 1" wide. The top layer of zeolite is dyed black using #15 black aqueous dye manufactured by Bestfoods Specialty Products, Indianapolis, Ind. The zeolite is previously subjected to repeated (about 30) adsorption and desorption cycles. After completing the last desorption cycle, the tray weight was 1029 grams, indicating that 141 grams of water was contained in the zeolite (i.e., 19% of dry zeolite weight). The tray is covered with polyethylene film about 0.010" in thickness, elevated at 15 degrees above horizon, and exposed to ambient air at night. (It should be noted that polyethylene has a good transmission properties at thermal radiation wavelengths.) After 1 hour of exposure the temperature of the zeolite was measured at 20.5 degrees Centigrade and the temperature of ambient air was measured at 18.1 degrees Centigrade.

Continuing now to refer to FIG. 4, depending on the nature of air currents in outside atmosphere 61, the air inside cavity 31 is exchanged many times during the adsorption cycle that generally lasts from sunset to sunrise. But even if the ambient air is entirely still, convective currents are established by the absorption process, which both dehumidifies and heats portion of the air that enters cavity 31. Such convective currents are then responsible for exchanging the air inside cavity 31, delivering air with higher humidity to sorption material 24, and exhausting air with reduced humidity to outside atmosphere 61.

The desorption cycle is preferably initiated after sunrise when the ambient air temperature starts rising significantly from its nighttime low levels. The desorption cycle is initiated with actuators 41 closing doors 42, which inhibits exchange of air between ambient air from outside atmosphere 61 and cavity 31. This condition is shown in FIG. 2. As solar radiation 21 passes through face sheet 22 and irradiates sorption medium 24, much of the solar energy is absorbed by sorption medium 24 and turned into heat. The light absorption efficiency of sorption medium 24 can be enhanced by coloring it with dark color (preferably black) dye. The same effect can be also achieved by coating the upper layer of sorption medium 24 by a fine dust of dark color such as, for example, carbon black. Experience shows that under these conditions solar radiation can heat sorption medium 24 to temperatures about 30 to 50 degrees above ambient air temperature.

As the temperature of sorption medium 24 is increased from its early morning temperature, the sorption medium heats the air in warming passage 30 and releases water vapor 49 into it. Resulting warm and humid air has a tendency to rise toward the higher portions of cavity 31, thereby establishing a warmed flow 62. Near the highest located portion of cavity 31 the humid air in warmed flow 62 comes into contact with condenser 38, especially internal fins 59 that extend into warming passage 30. As a result, this air is cooled and has a tendency to sink, which brings it to closer proximity of condenser 38, thereby intensifying the cooling effect. Air cooled in this fashion now enters cooling passage 32 and moves down along condensing surface 36 while being cooled even further. When the temperature of air in cooled flow 64 reaches the dew point, condensate starts forming on the condensing surface 36.

Depending on the wetting properties of condensing surface 36, a film, small droplets, or larger droplets 84 of liquid water form on the surface. Acting under the forces of gravity the condensate slides down toward drain hole 53 located at the lowest portion of cavity 31, and passes through drain tube 56 into anti-siphon vessel 58. As the air in cooled flow 64 reaches the lowest portion of cooling passage 32 it is heated by mixing, radiation from tray 28, and contact with warming fins 54. As a result, the air has a tendency to rise toward tray 28, thereby intensifying the warming effect. Air warmed in this fashion now enters warming passage 30 and moves up along bottom surface 26 of tray 28 while being further warmed and receiving water vapor 49 desorbed from sorption medium 24, thereby completing an entire cycle.

Liquid water condensate received by the anti-siphon vessel 58 is then transferred into water delivery assembly 27 and is provided by delivery tip 68 to the soil in the vicinity of plant roots (FIG. 1). Delivery tip 68 is a tube with very small holes near its inserted end to allow release of water into the soil. Preferably, such holes are sufficiently small to prevent plant roots to enter them. Alternately, walls of delivery tip 68 can be, at least in part, made of suitable micro-porous material easily permeable by water but impermeable to roots and insects.

As already noted, sorption medium 24 releases water vapor when it is being warmed. To prevent pressurization of cavity 31, air near the lowest portion of cavity 31 is allowed to escape through drain hole 53 into anti-siphon vessel 58 from where it is released through vent tube 60 into outside atmosphere 61.

The function of the autonomous watering system 10 of subject invention can be better understood from the following examples:

EXAMPLE 2

Figure 5:
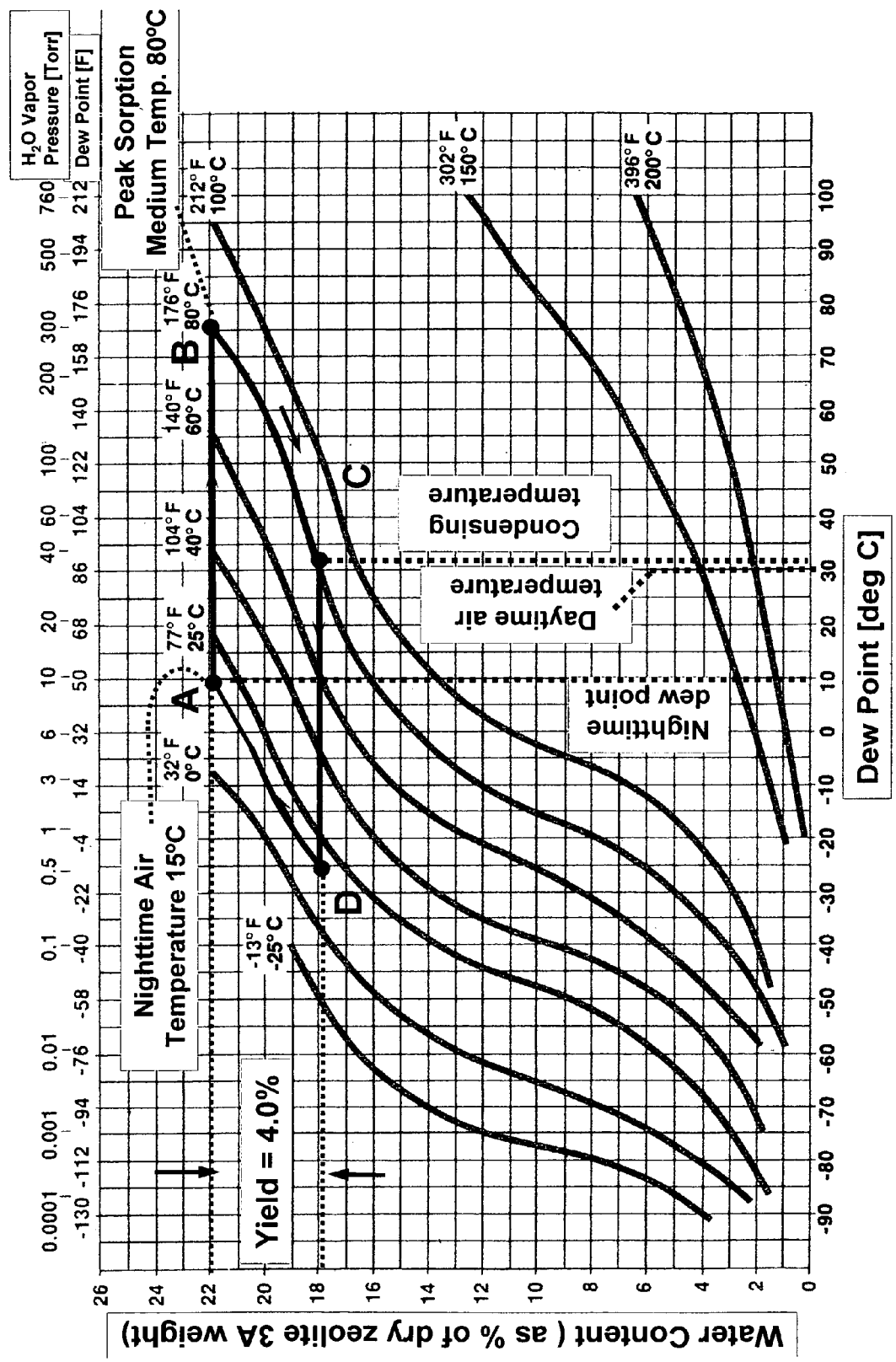
FIG. 5 is a graph illustrating isotherms of synthetic zeolite 3A and operating regimes of the adsorption-desorption-condensation cycle.

Consider an automatic watering system generally conforming to the first embodiment of the invention using 1 kg of type 3A synthetic zeolite sorption material. FIG. 5 shows the isotherms for zeolite 3A manufactured by Zeochem.™., Louisville, Ky., showing the amount of water held by the zeolite as a function of partial pressure of water vapor for several zeolite temperatures. It can be readily noted that a given constant temperature, a reduction in partial pressure of water vapor corresponds to a reduction in the water content in the zeolite, and visa versa.

Consider the nighttime conditions with ambient air temperature 15 degrees Centigrade and a dew point 10 degrees Centigrade. The latter corresponds to about 10 Torr partial pressure of water vapor. After appropriately long exposure the zeolite too be eventually cool down to about 15 degrees Centigrade and adsorb water vapor from surrounding air to correspond to 22% of its dry weight, or 220 grams. This condition is labeled as a point A in FIG. 5. During the day, the zeolite temperature is raised to 80 degrees Centigrade. This will raise the water vapor pressure in the air surrounding the zeolite to about 300 Torr. This condition is labeled as a point B in FIG. 5. Assume that the day time air temperature is 30 degrees Centigrade and that the condensing surface is maintained at 32 degrees Centigrade by ambient air cooling. The difference in temperatures between the zeolite at 80 degrees and the condenser at 32 degrees Centigrade will establish a convective flow that carries moist air with a dew point 80 degrees Centigrade from the zeolite to the condenser with a dew point 32 degrees Centigrade, thereby causing a formation of condensate on condensing surface 36. Providing that external conditions (namely solar heating and outside air temperature) are maintained, this process will continue until the partial pressure of water vapor in zeolite proximity is reduced to about 38 Torr, which corresponds to dew point of 32 degrees Centigrade. This condition is labeled as a point C in FIG. 5.

During the desorption process the zeolite condition can be represented at any given time by a point on the 80 degrees Centigrade isotherm between points B and C. Note that the point C corresponds to 18% of water content in the zeolite which translates to 180 grams. Hence, the desorption process removed 40 grams of water from the zeolite. Assuming that the following night the air temperature and dew point will be identical to the previous night (15 degrees Centigrade and a dew point 10 degrees Centigrade respectively), the zeolite will eventually cool down to the temperature of ambient air. This condition is labeled as a point D on the 15 degrees Centigrade isotherm in FIG. 5.

When the ambient air is allowed to contact the zeolite, the zeolite will remove water vapor from it. Assuming that the heat of sorption is rejected to ambient air (and/or radiated into space), the zeolite can be maintained at about 15 degrees Centigrade while adsorbing water. Providing that the ambient conditions (air temperature and humidity) do not change, this process will continue until the partial pressure of water vapor in the proximity of zeolite reaches the about 10 Torr partial pressure of water vapor in ambient air, which corresponds to the dew point of 10 degrees Centigrade. At that instant the zeolite assumes its initial condition labeled as a point A on the 15 degrees Centigrade isotherm in FIG. 5. As already noted, the entire process yielded 40 grams of water, corresponding to 4% of dry zeolite weight.

EXAMPLE 3

A tray already described in Example 1 was exposed to still air at about 15 degrees Centigrade and about 40-60% humidity at night. In the morning the tray weight is 1046 grams, indicating 158 grams of water content. Subsequently, the tray is incorporated into a test apparatus generally corresponding to the first embodiment of subject invention shown in FIG. 1 through 4, and exposed to sunlight in the period between 10 am and 5 pm. Peak daytime temperature was 31 degrees Centigrade. At the end of this period, 24 grams of water condensate were collected in an external reservoir, which corresponds to about 3% of dry zeolite weight.

Figure 6:
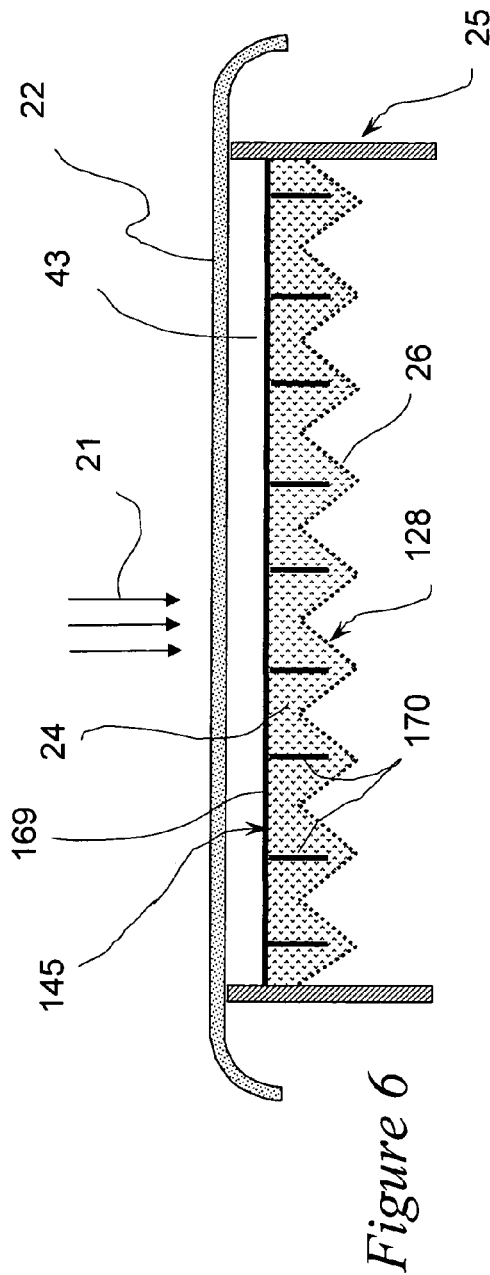
FIG. 6 is a cross-sectional view of an alternate tray cover design.

There are numerous variants to the invention and its components. FIG. 6 shows a tray 128 which is a variant to tray 28. Tray cover of tray 128 is a heat transfer element (HTE) 145, which collects solar radiation 21 and conducts it to sorption medium 24. HTE 145 is opaque in the solar radiation band and is preferably made of thermally conducting material such as copper or aluminum alloys, and is placed in a good thermal communication with sorption medium 24, so that the solar energy absorbed by HTE 145 can be efficiently conducted to the sorption material 24. In addition, front surface 169 of HTE 145 can be provided with a coating (e.g., black color) to would further improve its absorption of solar radiation 21. If aluminum is used for construction of HTE 145, front surface 169 can be anodized black. HTE 145 preferably includes heat conducting fins 170 that are immersed into sorption medium 24. Fins 170 improve the conductive heat transfer from the front surface 169 to sorption medium 24. To further enhance transport of thermal energy into sorption medium 24, heat conductive fins 170 can be furnished with a coating that is highly emissive in the thermal radiation band. Preferably, fins 170 are made an integral part of the HTE 145. For example, HTE 145 can be an extruded part. Alternately, heat conducting posts can be used instead of the fins 170 to conduct heat from the front surface 169 to sorption medium 24.

Figure 7:
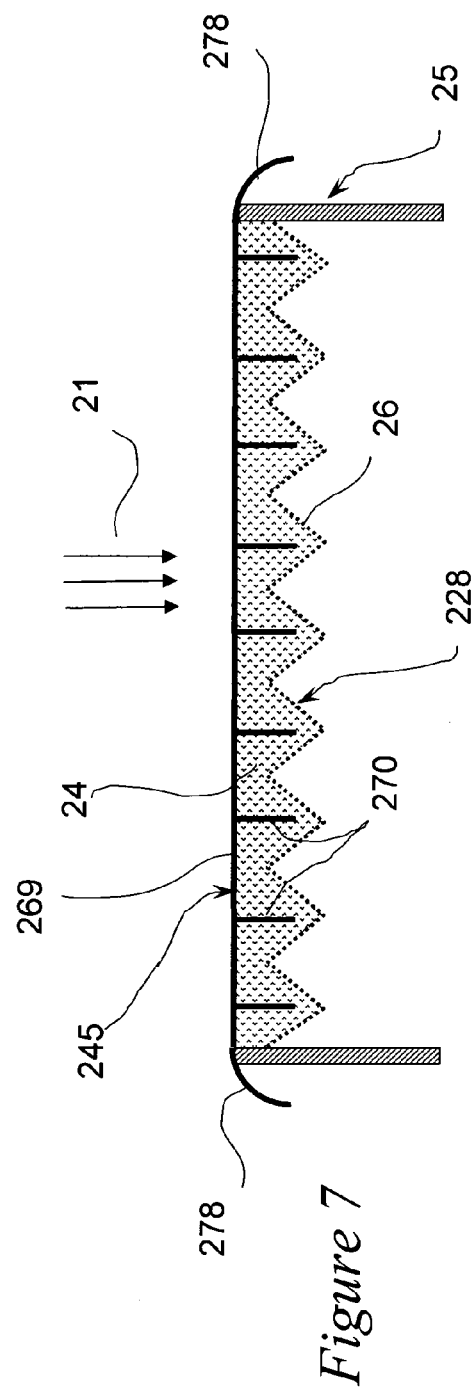
FIG. 7 is a cross-sectional view of another alternate tray cover design.

FIG. 7 illustrates tray 228 which is yet another variant of tray 28. HTE 245 includes edges 278 that increase its size and allow it to function both as a collector of solar radiation 21 and a roof protecting housing 25 and other parts of the water source assembly from the inclement weather. Hence, it is not necessary to use face sheet 22 when using tray 228 in construction of the water source assembly. HTE 245 is preferably provided with fins 270 for improved transfer of heat to sorption material 24. This feature is analogous to the design of HTE 145.

Figure 8:
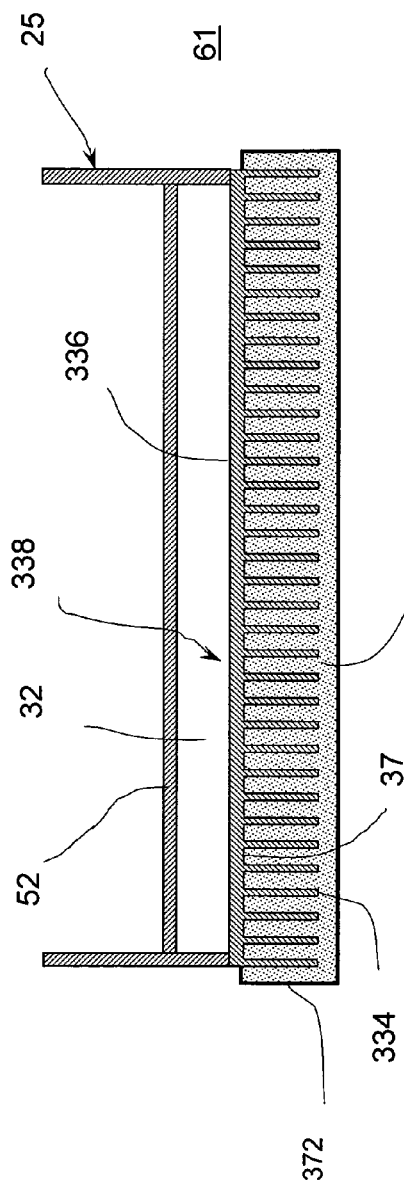
FIG. 8 is a cross-sectional view of alternate condenser design.

FIG. 8 illustrates a condenser 338 which is a variant of condenser 38 capable of operating at a reduced temperature and thereby generating higher water output. Condenser 338 has the same general construction as condenser 38, except that external fins 334 of condenser 338 are not air-cooled by immersion in outside atmosphere 61, but rather immersed in a phase change medium 371 held in container 372. A phase change medium is a substance that can be used to store heat in its latent heat when melted from solid to liquid form. A phase change medium suitable for use with the invention would have a phase change temperature (i.e., melting point) between the nighttime air temperature and the desired condensing temperature of the condensing surface 336.

In practice, a melting point in the range of 20 to 35 degrees Centigrade is acceptable. Fortuitously, there are several substances meeting this criterion. Suitable phase change medium includes Glauber's salt (sodium sulphate decahydrate, Na.sub.2SO.sub.4.10H.sub.2)), which melts at 31 degrees Centigrade and has a latent heat of 169 kJ/kg. This material is also available in commercial packaging under name Calotherm 31 available from Calor Alternative Energy in the United Kingdom. Another suitable material is calcium chloride hexahydrate (CaCl.sub.2.6H.sub.20) which, according to a research at the Australian National University, has a latent heat of 200 kJ/kg and can be formulated to have a transition point at a temperature anywhere in the range from 22 to 29.5 degrees Centigrade.

The external walls of container 372 are insulated to minimize direct thermal communication between phase change medium 371 and outside atmosphere 61. Phase change medium 371 operates as follows: Assume that at the start of the desorption cycle the phase change medium is solid and at approximately the temperature of night air. During the day, recirculating air flow inside the autonomous water source delivers warm air with high humidity to condensing surface 336 where some of the moisture is condensed. Heat of condensation is rejected by condensing surface 336 from which it is conducted via external fins 334 into phase change medium 371 and gradually melts it. Preferably, the quantity of phase change medium 371 is determined so that the melting process is completed near the end of the desorption cycle.

As already explained in conjunction with FIG. 4, during the night, cool air from outside atmosphere 61 admitted into cavity 31. There it contacts condensing surface 336 and, using external fins 334 as a thermal conductor, extracts heat from the phase change medium 371, causing it to change phase from liquid to solid. As the ambient air receives heat from the phase change medium 371, favorable conditions are established for natural convection flow in cooling passage 32 (FIG. 4) that helps to exchange air inside the autonomous water source. This, in turn, benefits both the cooling of phase change medium and the adsorption process. Alternate way to cool and solidify the phase change medium is to allow it to conduct heat through container 372 into outside atmosphere 61.

Figure 9:
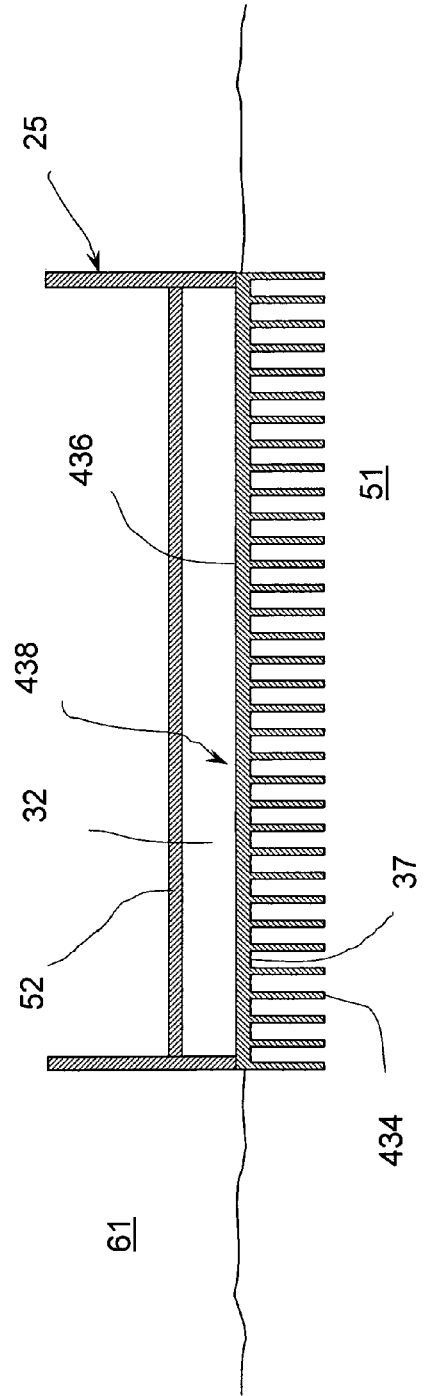
FIG. 9 is a cross-sectional view of another alternate condenser design.

FIG. 9 illustrates a condenser 438 which is another variant of condenser 38 using the soil in ground 51 as a heat sink. Condenser 438 has external fins 434 which are inserted into the soil. This approach takes the advantage of the relative stable temperature of the soil at a modest distance (about 12-24 inches) from the ground 51 surface. Water vapor condenses on the surface 436 and transfers its latent heat to it. This heat is then transferred by conduction to external fins 434 and conducted to the soil.

FIGS. 10a and 10b show water source assembly 511 using an alternate method for introducing ambient air to the sorption medium during the adsorption cycle. In this case, housing 525 does not have doors for admitting air from outside atmosphere 61 into its interior (in contrast to the housing 25 in FIG. 2). During the daytime operation (desorption), face sheet 522 is placed against the upper portion of housing 525 so that the joints between the two components are sealed (FIG. 10a). During the night operation (adsorption), ambient air from outside atmosphere 61 is introduced to sorption medium 24 by lifting face sheet 522 (FIG. 10b). Ambient air now has access to the top portion of tray 28 and sorption medium 24 therein.

In this embodiment, tray cover 45 (FIG. 2) (if used) must be easily permeable to air. Preferably, tray cover 45 employed here is a wire mesh or perforated sheet. At the end of the adsorption cycle the face sheet 522 is restored to its daytime position (FIG. 10a). One advantage of this method is that outside air cannot directly access condensing surface 36, which reduces the chances of dust and other foreign matter being introduce there. In particular, the only access path for microorganisms to reach condensing surface 36 leads through sorption medium 24 (which is essentially a packed bed) where they are likely to be destroyed by the high temperatures during the desorption phase.

FIGS. 11a and 11b show water source assembly 611 using yet another way for introducing ambient air to the sorption medium during the adsorption cycle. In this embodiment, housing 625 does not have doors for admitting air from outside atmosphere 61 into its interior (in contrast to housing 25 in FIG. 2). During the daytime operation (desorption), face sheet 622 is placed against the upper portion of housing 525 and the joints between the two are sealed (FIG. 11a). During the nighttime operation (adsorption), ambient air is introduced to sorption medium 24 by lifting the face sheet 522 and tray 28 (FIG. 11b). Ambient air now has an access to bottom 26 of tray 28 and sorption medium 24 therein. At the end of the adsorption cycle face sheet 522 and tray 28 are restored to their daytime position (FIG. 11a).

Figure 12:
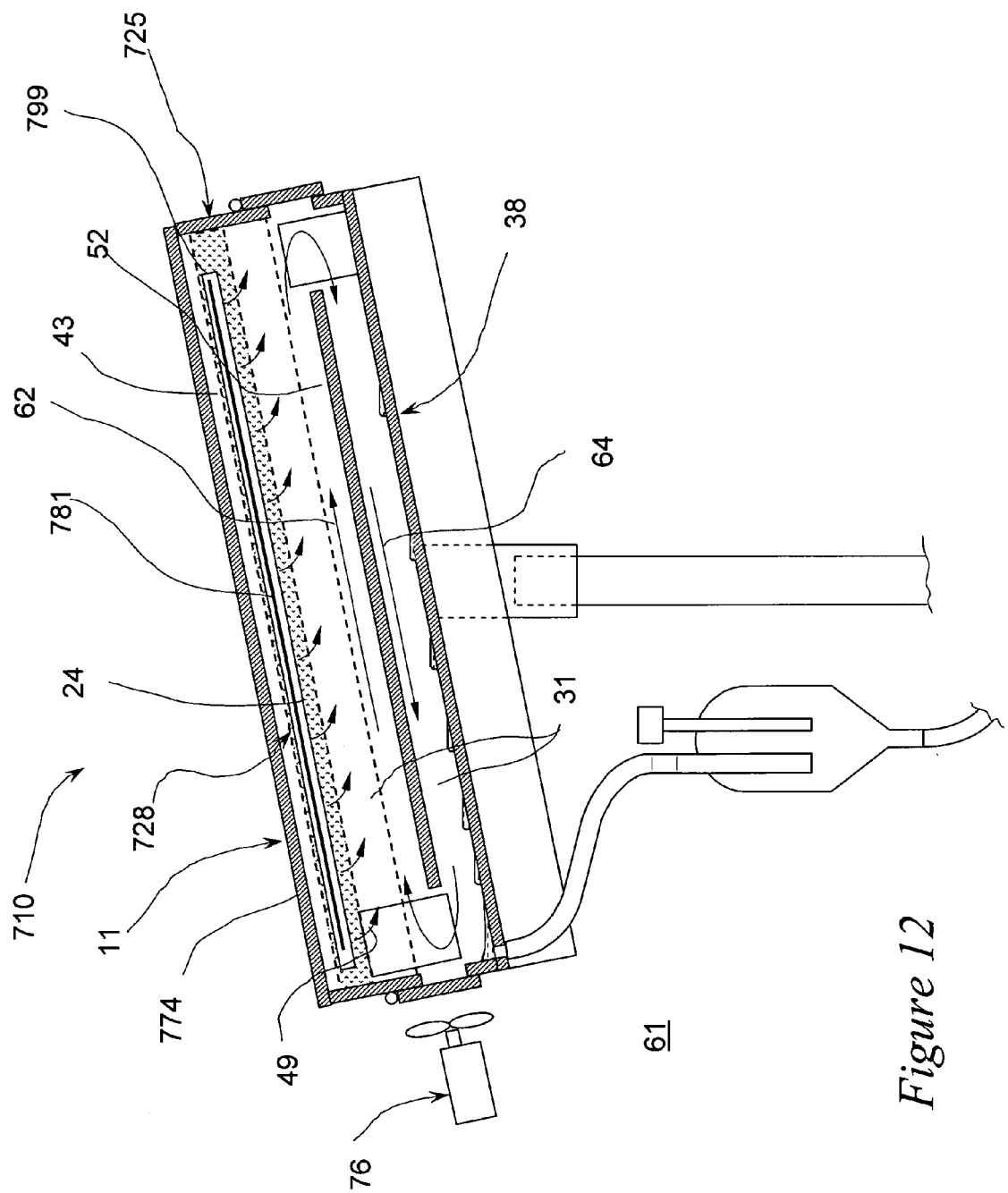
FIG. 12 is a cross-sectional view of an autonomous water source in accordance with a second preferred embodiment of the subject invention suitable for indoor operation.

Another autonomous water source 710 in accordance with a second preferred embodiment of the subject invention suitable for indoor operation is illustrated in FIG. 12. The second preferred embodiment of the subject invention is substantially the same as the first embodiment except that sorption medium 24 is heated by electric, rather than solar power. In particular, housing 725 for use with a second preferred embodiment has cover 774, which is preferably opaque and is made of material with low thermal conductivity. Suitable material for fabrication of cover 774 include those for fabrication of housing 25. In addition, the exterior and interior surfaces of cover 774 can be furnished with a layer of material having low thermal emissivity. Furthermore, cover 774 can include a layer of suitable thermal insulation. Tray 728 used with a second preferred embodiment of the invention is substantially the same as tray 28 for use with a first embodiment but also includes HTE 799 comprising electric heater 781. HTE 799 is in a good thermal communication with the electric hater 781 and sorption medium 24. Preferably, HTE 799 is imbedded in sorption medium 24.

Since the second embodiment of the invention operates on electricity, its operation is not restricted to any particular part of the day. During the desorption cycle, electric power is provided to heater 781 and sorption medium 24 is heated to about 20 to 50 degrees above ambient air temperature. Suitable temperature control can be provided by thermostat. Alternately, an electronic temperature control can be used. Just as in the desorption cycle practiced with the first embodiment of the invention, water vapor released by heating sorption medium 24 is carried by a closed cycle convective flow to condenser 38 where much of the moisture is condensed to liquid. At the end of the desorption cycle, the supply of electric power to heater 781 is terminated and sorption medium 24 is allowed to cool down. Once the sorption medium temperature approaches the temperature of ambient air in the outside atmosphere 61, the adsorption cycle is initiated. The adsorption cycle for practicing with the second embodiment of the invention is identical to the adsorption cycle practiced with the first embodiment of the invention. To expedite the absorption cycle, an electric fan 76 can be used to induce air into the proximity of sorption medium 24. The adsorption-desorption process can be repeated several times a day.

The angle of elevation of autonomous water source 710 can be significantly greater than in the first embodiment of the invention; up to nearly 90 degrees. This improves the convective flow inside the unit and increases water production rates. It may be noted that the second embodiment of the invention is particularly suited for watering of indoor plants and for production of household or drinking water where the use of electric power is preferable over solar power. Alternate uses for the second embodiment of subject invention include dehumidification of indoor air. The unit can receive electric power from a wall socket, preferably stepped down to lower voltage for improved safety. The unit can include electrical and/or electronic controls including a timer, calendar clock, soil humidity sensor, and microcomputer to appropriately adjust water delivery quantity and timing.

Figure 13:
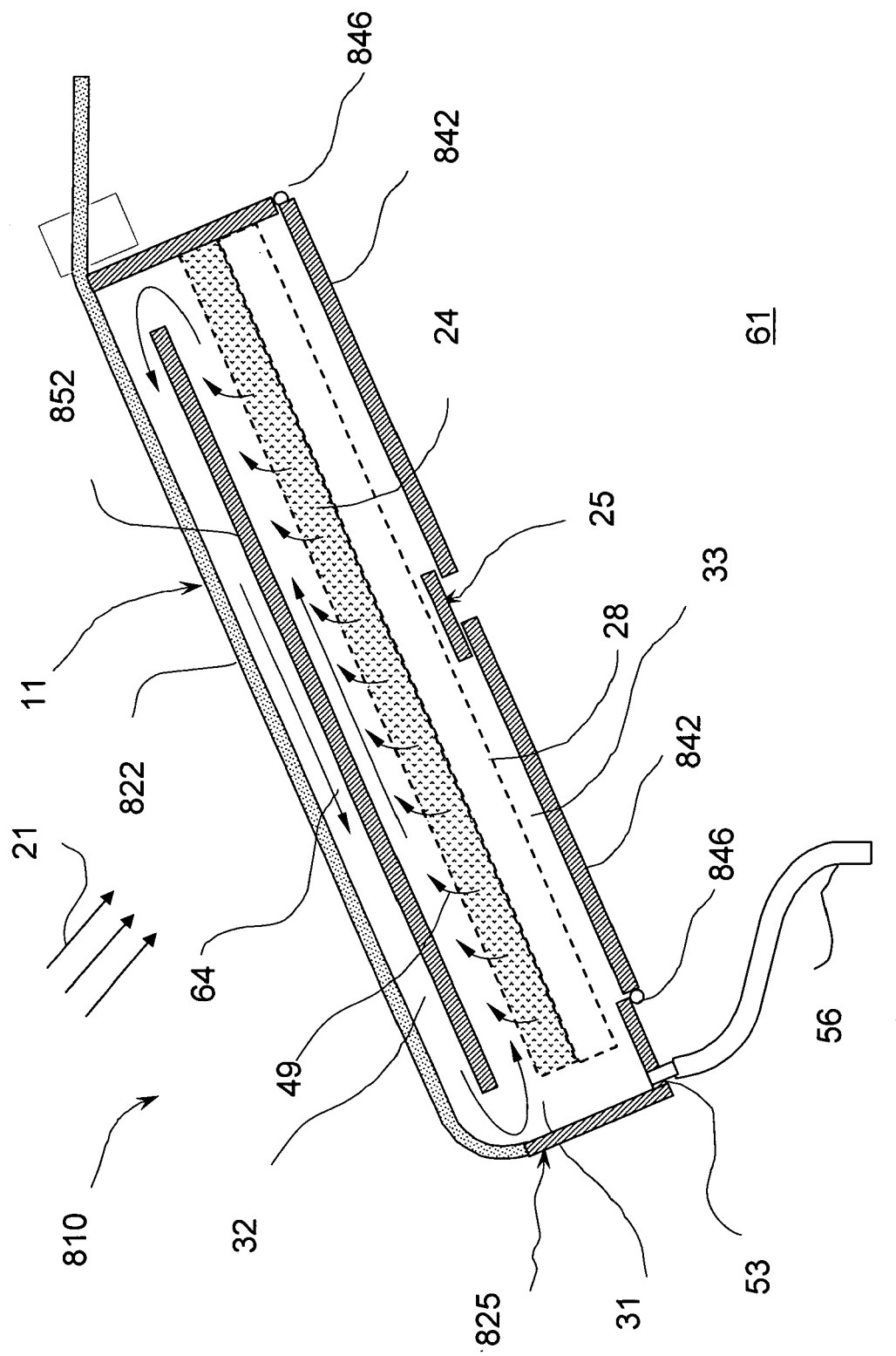
FIG. 13 is a cross-sectional view of an autonomous water source in accordance with a third preferred embodiment of the subject invention having a transparent condensing element.

An autonomous water source 810 in accordance with a third preferred embodiment of the subject invention suitable for outdoor operation is illustrated in FIG. 13. The third preferred embodiment of the subject invention is substantially the same as the first embodiment except that face sheet 822 is used both to transmit solar radiation 21 to sorption medium 24 and to condense desorbed water vapor. In particular, face sheet 822 is made of material that is both transparent in the solar radiation band and has a good thermal conductivity. Suitable materials for fabrication of face sheet 822 include certain types of glass, fused silica quartz, certain transparent ceramics, and sapphire. Flow separator 852 is made of material that is transparent in the solar radiation band and preferably has a low thermal conductivity. Suitable materials for fabrication of the flow separator include Plexiglas.™., lexan, acrylic, and certain types of glass.

During the desorption cycle, solar radiation 21 passes through face sheet 822 and flow separator 852 and heats sorption medium 24 in tray 28. In a manner similar to the desorption cycle practiced with the first embodiment of the invention, water vapor 49 released by heating sorption medium 24 is carried by a closed cycle convective flow to face sheet 822 where much of the moisture is condensed to liquid. Heat released in condensation is conducted to the exterior side of face sheet 822 and transferred to ambient air. The adsorption cycle for practicing with the third embodiment of the invention is very similar to the adsorption cycle practiced with the first embodiment. In particular, the adsorption cycle is initiated by opening doors 842 which revolve on hinges 846, thereby allowing ambient air Actuators 41 for use with the first, second, and third embodiments of the subject invention are preferably of the rotary type preferably acting directly on the hinged door 42. Such actuators include gear motors, rotary solenoids. Alternately, linear actuators equipped with appropriate linear-to-rotary translation mechanism can be used. Suitable linear-to-rotary translation mechanisms include motion screw and crank. If sliding door is used in lieu of the hinged door 42, preferred actuators are of the linear type such as linear solenoids and thermal actuators. Suitable thermally activated actuator has a thermally sensitive element that significantly changes in size and/or shape with temperature, as is the case for example, with bimetallic elements. One type of suitable thermal actuators is disclosed, for example, by Greenleaf et al in U.S. Pat. No. 4,463,560. Alternately, a thermal actuator using a phase change medium can be used. A suitable linear thermal actuator is disclosed, for example, by Stratynski et al in U.S. Pat. No. 4,227,412. Preferably, the thermally sensitive element can collect solar radiation and thus heat up during the daytime, and conduct away the heat to cool down during the nighttime. Such an actuator responds to solar heating by closing shut door 42 during the daytime and open the doors during the nighttime.

Figure 14:
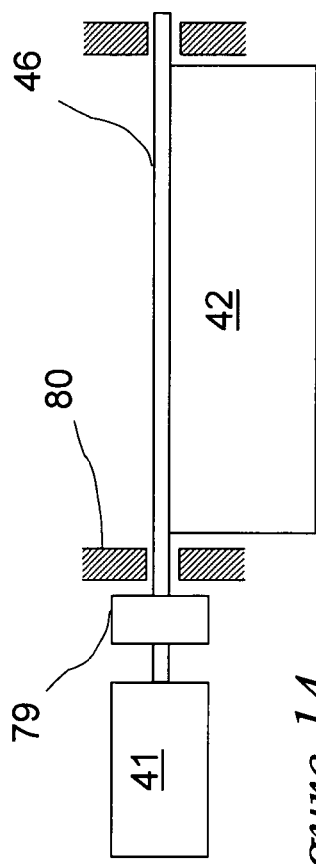
FIG. 14 is a partial sectional view illustrative in detail of a connection between the actuator and the door.

A suitable arrangement of an actuator 41 and door 42 mounted on hinge 46 inserted in bearings 80 is illustrated in FIG. 14. To accommodate seasonal variations in temperature, the actuator mechanical range is designed to significantly exceed that of the door 42, and the actuator is preferably coupled to the door via slip clutch 79. By slipping the clutch when the door travel reaches its limits centers the effective range of the actuator and assures proper cooling and opening action over a wide range of temperatures encountered during year's seasons. In addition, the autonomous water source may be automatically weathered (rendered dormant) for winter simply by preventing the doors from opening. This can be accomplished with thermal actuator operated latches that block the door when temperature drops below certain limit. The second embodiment of the invention is preferably practiced with electrically operated actuators, such as electric gear motors or solenoids.

The subject invention can be practiced in numerous variants. For example, increasing the desorption temperature allows more of the adsorbed water to be removed from the sorption medium. In the first and third embodiments of the subject invention this can be accomplished by increasing the solar energy input. This can be accomplished by several means, namely by 1) positioning the autonomous water source at an optimum angle with respect to the sun, 2) concentrating solar radiation and, 3) placing the autonomous water source onto a moving mount which tracks sun's position during the day. To facilitate easy positioning for optimum sun orientation, mounting socket 63 (FIG. 2) can include a spherical joint or a two-axis mount with appropriate manual set screw(s). Solar power can be conveniently concentrated using either reflecting elements and/or lensing elements that direct increased quantity of solar radiation into the face sheet and sorption medium 24. Preferred lensing element for use with the subject invention is one or more Fresnel lenses since they are inexpensive and very compact. Alternate lensing element is an array of microlenses. If convenient, lensing and reflecting elements can be used simultaneously.

Another class of variants of the invention uses small, electrically driven fans. For example, a fan can be provided to deliver air flow to the external fins of the condenser, thereby improving the heat transfer rate. A fan can be used improve delivery of fresh air to the sorption medium during the adsorption cycle. A fan can be also used internally within the unit to further promote convection flow between the sorption medium and the condenser. Such fans can be readily used with the second embodiment of the invention since it already operates on electricity. However, fans can be also used with the first and third embodiments providing that there is a suitable source of electric power, such as solar cells or batteries, or a connection to external power source.

Figure 15:
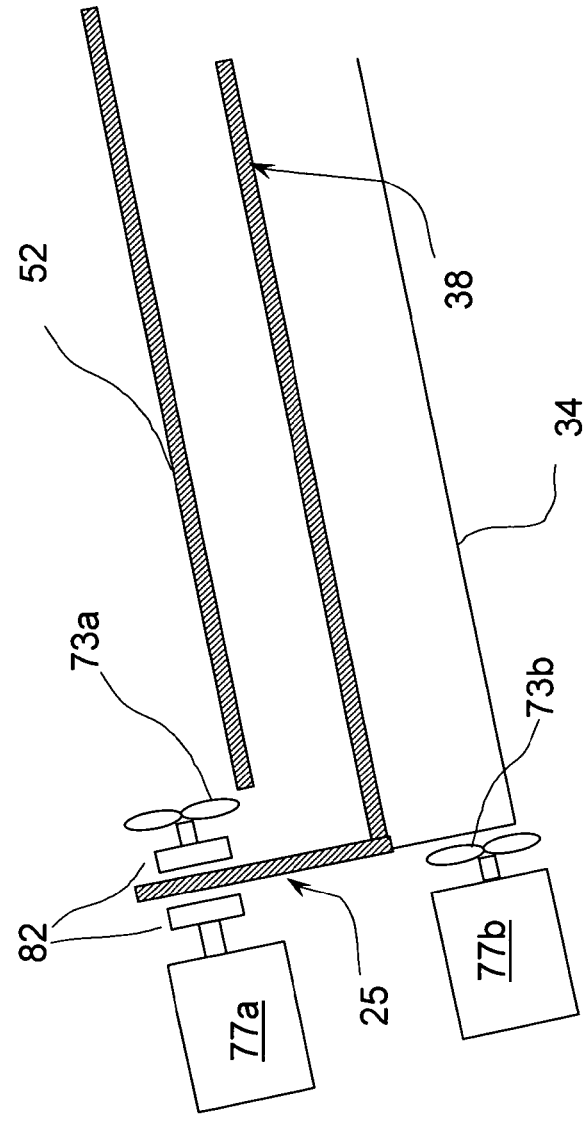
FIG. 15 is a partial sectional view illustrating installation of fans for promoting air flow.

Fan 73*a* internal to housing 25 can be driven via magnetic coupling 82 by electric motor 77*a* from the outside is illustrated in FIG. 15. This avoids placing electric equipment and connections in the high humidity environment during the desorption cycle. Alternately, a fan internal to the housing can be driven electro-magnetically by electromagnetic coils placed outside the housing. In this case, the coils act as a stator and the fan acts as a rotor of an AC motor. The figure also shows motor 77*b* directly driving fan 73*b* delivering air to external fins 34 of condenser 38.

The units in accordance with the first and third embodiments of the invention which are intended for outdoor use may also include can include electrical and/or electronic controls including a timer, calendar clock, soil humidity sensor, air humidity sensor, air temperature sensor, and high wind sensor. In addition, the units may include a microcomputer to appropriately adjust water delivery quantity and time of delivery, administer delivery of fertilizer and/or anti-transpirator, place the unit on hold (doors closed) during the times high-winds, and automatically winter the unit (doors closed) when air temperatures fall close to freezing. Solar cells (preferably with rechargeable battery backup) can be used as a source of electric power for operation electrical and electronic equipment. It can be appreciated that the electric power requirements for the first and third embodiments of the subject invention are very low, hence the required solar cell can be rather small and inexpensive. Alternately, the electrical and electronic equipment can be operated from a battery. Because of the low power requirements, two D-size cells are expected to last several years.

This invention is not to be limited by the embodiment shown in the drawings and described in the description which is given by way of example and not of limitation, but only in accordance with the scope of the appended claims.

What is claimed is:

1. An autonomous water source apparatus for extracting water vapor from atmospheric air to produce liquid water comprising;
    a housing;
    a closure to selectively open said housing to communicate with outside atmosphere or restrict said housing from outside atmosphere;
    a sorption medium inside said housing;
    a condenser forming a wall of said housing, said condenser adapted for rejecting heat in real-time to environment outside said housing;
    a heat transfer element for heating said sorption medium;
    a passageway for delivering condensed liquid water to the exterior of said housing;
    said sorption medium and said condenser each being constructed and arranged for communication therebetween by a closed natural convection loop of air flow inside said housing;
    said natural convection loop being operated by addition of heat from said sorption medium and removal of heat by said condenser.

2. The apparatus according to claim 1 further comprising a flow separator.

3. The apparatus according to claim 1 wherein said environment is said outside atmosphere.

4. The apparatus according to claim 1 wherein said heat transfer element is a window substantially transmissive in solar radiation band.

5. The apparatus according to claim 4 wherein said heat transfer element is additionally substantially transmissive in thermal radiation band.

6. The apparatus according to claim 4 wherein said sorption medium is dyed a color that enhances absorption of light in the solar radiation band.

7. The apparatus according to claim 1 wherein said heat transfer element is an electric heater in good thermal communication with said sorption medium.

8. The apparatus according to claim 1 wherein said sorption medium is provided in trays having at least one wall made of porous material permeable to air and water vapor.

9. Apparatus for extracting water vapor from atmospheric air to produce liquid water comprising;
    a housing;
    a closure to selectively open said housing to communicate with outside atmosphere or restrict said housing from said outside atmosphere;
    a sorption medium inside said housing;
    a condenser forming a wall of said housing;
    an electric heating element in a good thermal communication for heating said sorption medium;
    a passageway for delivering condensed liquid water to the exterior of said housing; and
    said sorption medium and said condenser constructed and arranged for thermal communication therebetween by a closed natural convection loop of air inside said housing.

10. The apparatus according to claim 9 further comprising a flow separator.

11. The apparatus according to claim 9 wherein said condenser is adapted for rejecting heat to said outside atmosphere.

12. The apparatus according to claim 9 wherein said condenser is adapted for rejecting heat to said outside atmosphere.

13. The apparatus according to claim 9 wherein said natural convection loop being operated by addition of heat from said sorption medium and removal of heat by said condenser.

14. A method of extracting water vapor from atmospheric air to produce liquid water comprising the acts of:
    providing a housing;
    providing a sorption medium inside said housing;
    providing a condenser forming a wall of said housing;
    exposing said sorption medium to atmospheric air until it is substantially saturated with water;
    isolating said sorption medium from ambient air;
    heating said sorption medium to release water vapor into air in its proximity to create high-water-vapor-content air;
    flowing said high-water-vapor-content air to said condenser;

contacting said high-water-vapor-content air with said condenser to condense water therefrom and create reduced-water-vapor-content air;

rejecting heat from said condenser to atmospheric air;

flowing said reduced-water-vapor-content air into the proximity of said sorption medium;

forming a natural convection flow of air carrying high-water-vapor-content air from said sorption medium to said condenser and returning reduced-water-vapor-content air into the proximity of said sorption medium;

continuing said natural convection flow until substantial portion of the water content from said sorption medium is transferred to said condenser; and collecting said water content transferred to said condenser.

15. The method of claim 14 wherein said act of rejecting heat from said condenser to atmospheric air further comprises cooling of said condenser to below the dew point of said high-water-vapor-content air.

16. The method of claim 14 in which said act of heating comprises heating by solar radiation.

17. The method of claim 14 in which said act of heating comprises heating provided by electric heating.

18. The method of claim 14 in which said condenser additionally rejects heat into a phase change medium.

19. The method of claim 14 in which said sorption medium rejects heat of sorption primarily into atmospheric air.

20. The method of claim 14 in which said act of exposing said sorption medium to atmospheric air until it is substantially saturated with water further comprises rejecting heat of adsorption to atmospheric air.

21. The apparatus according to claim 1 wherein said environment is soil.

* * * * *